United States Patent
Miyamoto et al.

(10) Patent No.: US 12,119,013 B2
(45) Date of Patent: Oct. 15, 2024

(54) ACOUSTIC CROSSTALK SUPPRESSION DEVICE AND ACOUSTIC CROSSTALK SUPPRESSION METHOD

(71) Applicant: PANASONIC INTELLECTUAL PROPERTY MANAGEMENT CO., LTD., Osaka (JP)

(72) Inventors: Masanari Miyamoto, Fukuoka (JP); Naoya Tanaka, Osaka (JP); Hiromasa Ohashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 318 days.

(21) Appl. No.: 17/778,277

(22) PCT Filed: Nov. 16, 2020

(86) PCT No.: PCT/JP2020/042675
§ 371 (c)(1),
(2) Date: May 19, 2022

(87) PCT Pub. No.: WO2021/100671
PCT Pub. Date: May 27, 2021

(65) Prior Publication Data
US 2022/0415337 A1    Dec. 29, 2022

(30) Foreign Application Priority Data
Nov. 21, 2019    (JP) .................................. 2019-210690

(51) Int. Cl.
*G10L 21/00*    (2013.01)
*G10L 15/20*    (2006.01)
(Continued)

(52) U.S. Cl.
CPC .......... *G10L 21/0208* (2013.01); *G10L 15/20* (2013.01); *H04R 3/02* (2013.01)

(58) Field of Classification Search
CPC ....... G10L 15/20; G10L 21/003; G10L 21/02; G10L 21/0272; G10L 21/0208;
(Continued)

(56) References Cited

U.S. PATENT DOCUMENTS

| | | | |
|---|---|---|---|
| 2007/0019825 A1 | 1/2007 | Marumoto et al. | |
| 2018/0158467 A1 | 6/2018 | Suzuki et al. | |

(Continued)

FOREIGN PATENT DOCUMENTS

| | | | |
|---|---|---|---|
| JP | 2006-039108 A | 2/2006 | |
| JP | 2007-019595 A | 1/2007 | |

(Continued)

OTHER PUBLICATIONS

International Search Report (including English Language Translation), mailed Dec. 28, 2020, by the Japan Patent Office (JPO), in International Application No. PCT/JP2020/042675.

*Primary Examiner* — Michael Ortiz-Sanchez
(74) *Attorney, Agent, or Firm* — Greenblum & Bernstein, P.L.C.

(57) ABSTRACT

An acoustic crosstalk suppression device includes a speaker estimation unit configured to estimate a main speaker based on voice signals collected by n units of microphones corresponding to n number of persons (n: an integer equal to or larger than 3); n units of filter update units each of which is configured to update a parameter of a filter configured to generate a suppression signal of a crosstalk component included in a voice signal of the main speaker; and a crosstalk suppression unit configured to suppress the crosstalk component by using a synthesis suppression signal generated by the maximum (n-1) units of filter update units (Continued)

corresponding to reference signals collected by the maximum (n-1) units of microphones.

11 Claims, 11 Drawing Sheets

(51) Int. Cl.
*G10L 21/02* (2013.01)
*G10L 21/0208* (2013.01)
*H04R 3/02* (2006.01)

(58) Field of Classification Search
CPC . G10L 2021/02082; G10L 2021/02087; G10L 13/02; G10L 13/033; G10L 17/00; H04R 3/02; H04R 3/005; H04S 2420/01; H04S 7/302; H04S 2400/11; G06F 17/00; G10K 2210/505; G10K 11/17881; G10K 11/17854; G10K 11/17817; G10K 11/178
See application file for complete search history.

(56) References Cited

U.S. PATENT DOCUMENTS

| | | | |
|---|---|---|---|
| 2021/0006900 A1* | 1/2021 | Ohashi | G10K 11/17817 |
| 2021/0289306 A1* | 9/2021 | Bharitkar | H04N 7/147 |
| 2022/0021975 A1* | 1/2022 | Patros | H04R 5/04 |

FOREIGN PATENT DOCUMENTS

| | | |
|---|---|---|
| JP | 2009-216835 A | 9/2009 |
| JP | 2011-248025 A | 12/2011 |
| JP | 2015-014675 A | 1/2015 |
| WO | 2017/064840 A1 | 4/2017 |

* cited by examiner (CONT.)

(FIG. 3 CONTINUED)
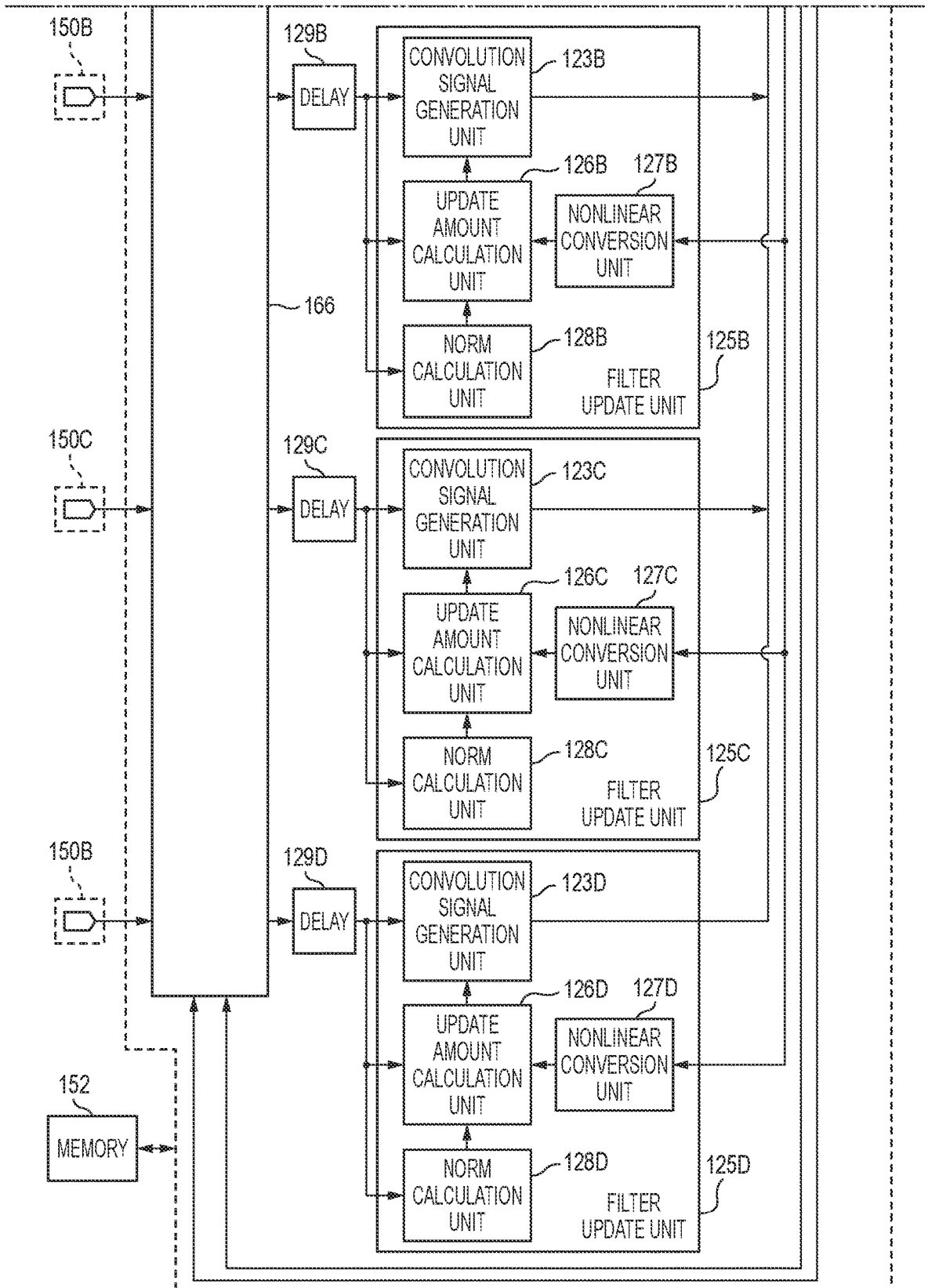

(CONT.)

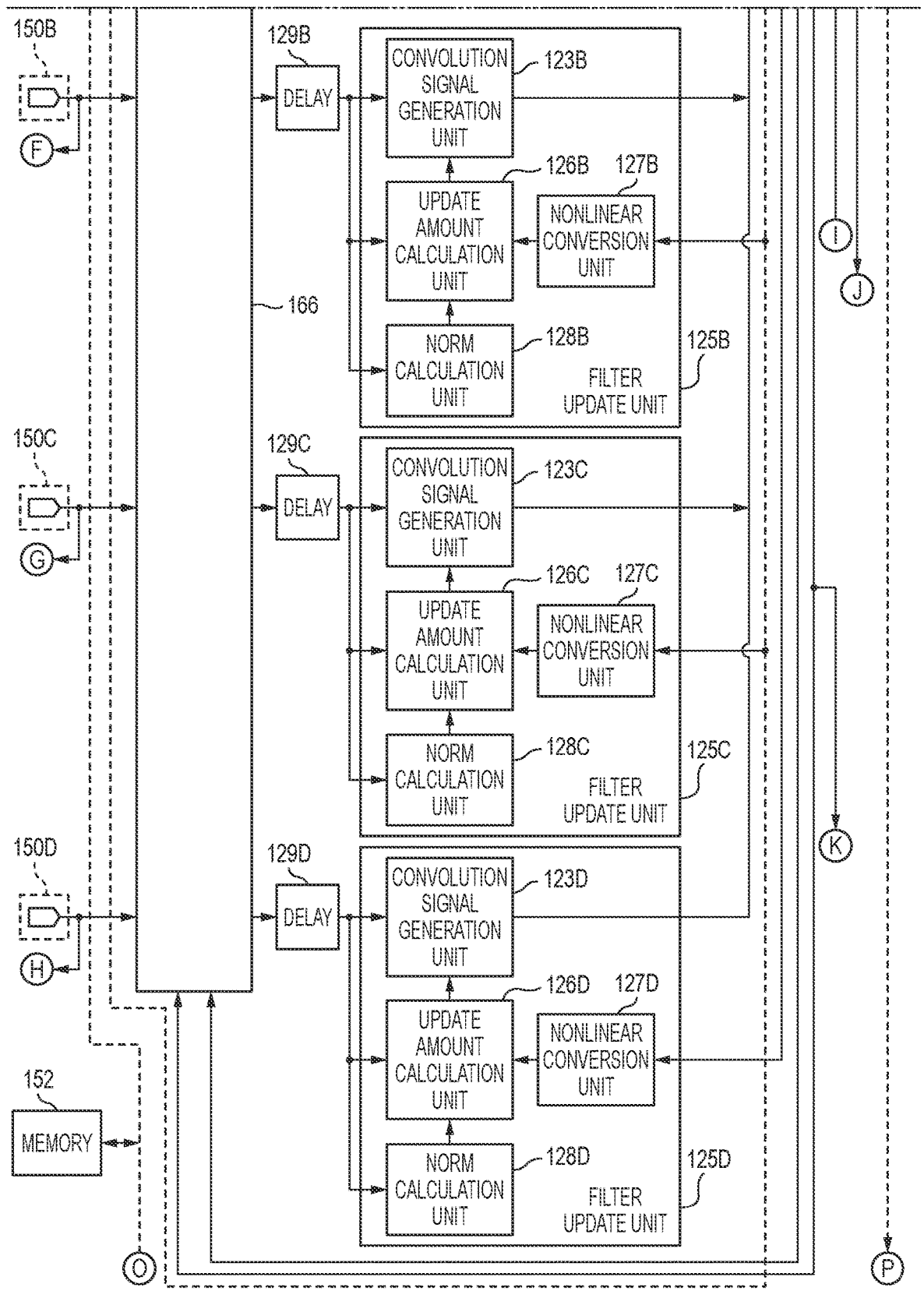

(FIG. 6 CONTINUED)
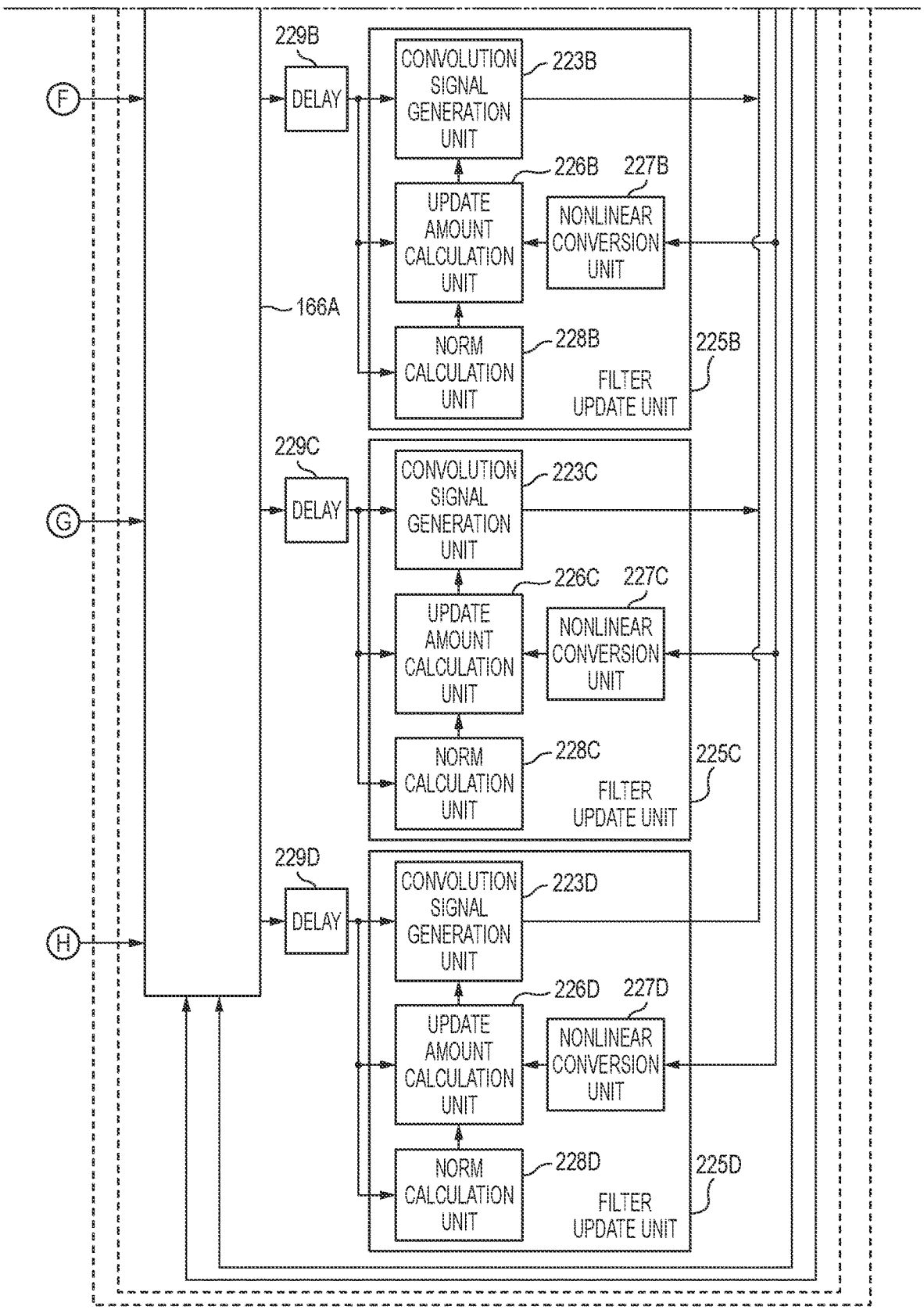

ACOUSTIC CROSSTALK SUPPRESSION DEVICE AND ACOUSTIC CROSSTALK SUPPRESSION METHOD

TECHNICAL FIELD

The present disclosure relates to an acoustic crosstalk suppression device and an acoustic crosstalk suppression method.

BACKGROUND ART

Patent Literature 1 discloses an acoustics removal device in which arrangement patterns of occupants are assumed in advance as a situation in a vehicle cabin, a sound transmission characteristic is measured for each arrangement pattern, and acoustics included in a voice signal output from a speaker are estimated and removed by using each transmission characteristic obtained by the measurement and stored in a memory or the like. According to the acoustics removal device, it is possible to remove or suppress acoustics as long as an arrangement of the occupants satisfies any one of the arrangement patterns.

CITATION LIST

Patent Literature

Patent Literature 1: JP-A-2009-216835

SUMMARY OF INVENTION

Technical Problem

In the configuration of Patent Literature 1, only one microphone intended to collect an uttered voice of a driver is disposed in front of the driver, and, for example, no microphone intended to collect voices of the occupants is disposed in front of another occupant. Since it is sufficiently considered that a plurality of occupants are present in the vehicle cabin, when not only the driver but also another occupant utters with the driver at substantially the same time, an uttered voice of the other occupant other than the driver is also collected by the microphone of the driver. Therefore, in the configuration of Patent Literature 1, it is not possible to suppress a crosstalk component based on utterance of the other occupant and included in the voice signal collected by the microphone of the driver. This is because it is difficult for the microphone of the driver to collect a clear voice uttered by the other occupant, and it is difficult to learn filter coefficient of an adaptive filter for suppressing the uttered voice of the other occupant as a crosstalk component.

The present disclosure has been devised in view of the above-described related-art circumstances, and an object thereof is to provide an acoustic crosstalk suppression device and an acoustic crosstalk suppression method that adaptively suppress an acoustic crosstalk component that may be included in an uttered voice of a main speaker present in a closed space such as a vehicle cabin and that improve sound quality of the uttered voice of the main speaker.

Solution to Problem

The present disclosure provides an acoustic crosstalk suppression device including: a speaker estimation unit configured to estimate a main speaker in a closed space based on voice signals collected by n units of microphones arranged in the closed space corresponding to n number of persons (n: an integer equal to or larger than 3); n units of filter update units each of which includes a filter configured to generate a suppression signal of a crosstalk component caused by utterance of another speaker and included in a voice signal of the main speaker, and each of which is configured to update a parameter of the filter for suppressing the crosstalk component to store an update result of the parameter of the filter therein; and a crosstalk suppression unit configured to suppress the crosstalk component included in the voice signal of the main speaker by using a synthesis suppression signal based on the suppression signals generated by the maximum (n-1) units of filter update units corresponding to reference signals collected by the maximum (n-1) units of microphones other than the microphone corresponding to the main speaker.

The present disclosure provides an acoustic crosstalk suppression method executed by an acoustic crosstalk suppression device, including: estimating a main speaker in a closed space based on voice signals collected by n units of microphones arranged in the closed space corresponding to n number of persons (n: an integer equal to or larger than 3); updating, by each of n units of filter update units, a parameter of a filter that generates a suppression signal of a crosstalk component caused by utterance of another speaker and included in a voice signal of the main speaker, and storing an update result of the parameter of the filter therein, suppressing the crosstalk component included in the voice signal of the main speaker by using a synthesis suppression signal based on the suppression signals generated by the maximum (n-1) units of filter update units corresponding to reference signals collected by the maximum (n-1) units of microphones other than the microphone corresponding to the main speaker.

ADVANTAGEOUS EFFECTS OF INVENTION

According to the present disclosure, it is possible to adaptively suppress an acoustic crosstalk component that may be included in an uttered voice of a main speaker present in a closed space such as a vehicle cabin, and to improve sound quality of the uttered voice of the main speaker.

DESCRIPTION OF EMBODIMENTS

Background of Present Disclosure

Figure 1:
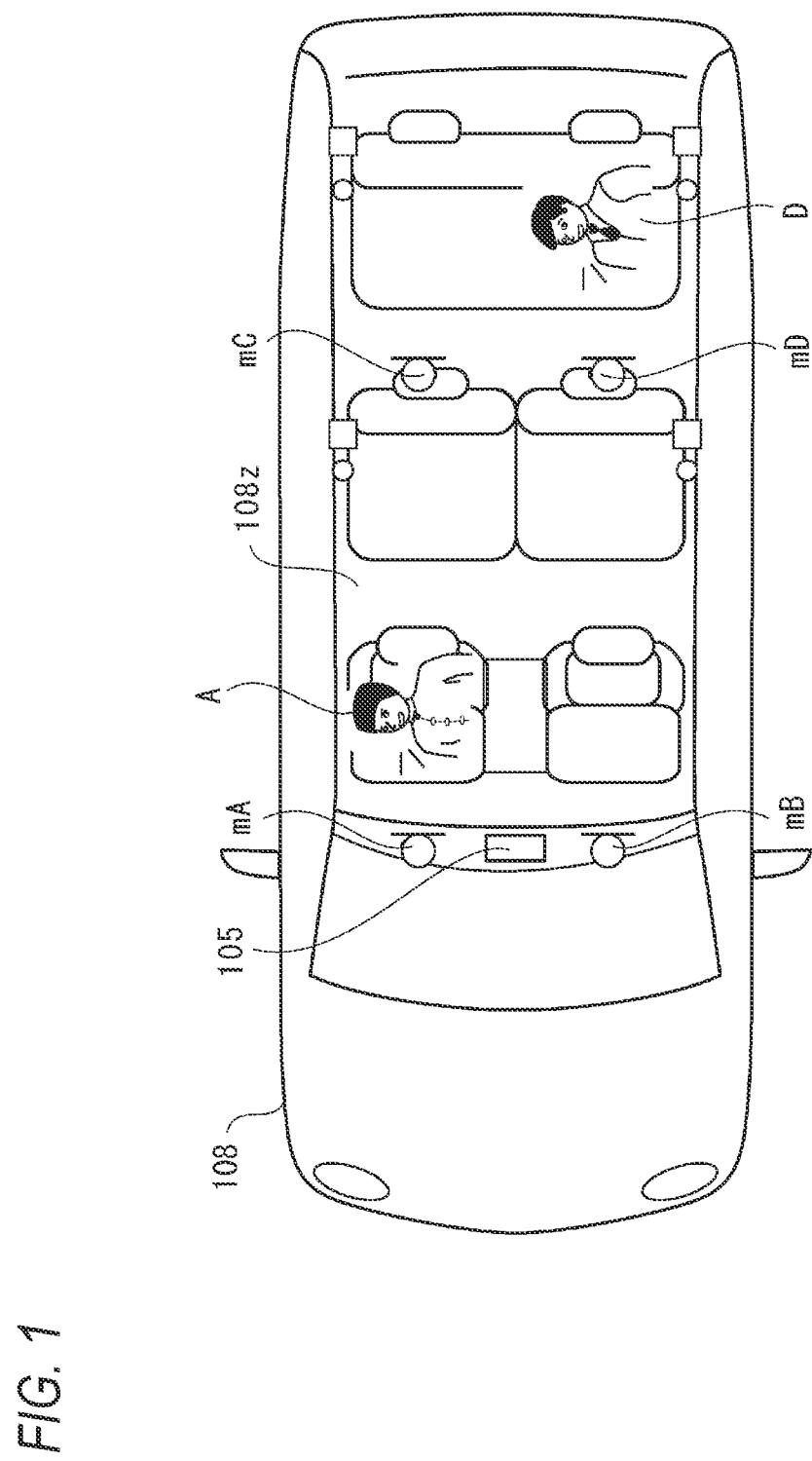
FIG. 1 is a diagram showing an arrangement example of occupants and microphones in a vehicle cabin of a vehicle on which an acoustic crosstalk suppression device according to a first embodiment is mounted.

For example, a situation is assumed in which both an occupant A and an occupant D in a vehicle cabin of a vehicle, which is a closed space, talk with each other (see FIG. 1). As shown in FIG. 1, in addition to a microphone mA placed in front of the occupant A and a microphone mD placed in front of the occupant D, a microphone mB placed in front of a front passenger seat and a microphone mC placed in front of another rear seat are further arranged in the vehicle cabin. Here, a case where a voice of the occupant D collected by the microphone mD is recognized by voice is assumed. It is necessary to suppress a voice uttered by the occupant A that is a crosstalk component and that is included in the microphone mD. In this case, it is considered that the crosstalk component is suppressed by an adaptive filter by using a voice signal of a voice collected by the microphone mD as a main signal and a voice signal of a voice collected by the microphone mA as a reference signal, and suppression performance of the crosstalk component that is a voice of the occupant A may be enhanced by using the voice signals of the voice of the occupant A collected by the microphone mB and the microphone mC as the reference signals. This is because, in a case of the closed space such as the vehicle cabin, a part of a voice band of the voice of the occupant A, particularly, a sound in a low frequency range, may be offset by reflection or the like and may not be collected by the microphone mA due to reflected waves or the like. In voice recognition, since the sound in the low frequency range close to a frequency band of a voice uttered by a person is important, accuracy of the voice recognition may be fairly reduced.

The microphone mD may not be able to clearly collect the voice of the occupant D who is desired to be subjected to the voice recognition. As causes of this, for example, a situation in which some obstacle is present between a mouth of the occupant D and the microphone mD (see FIG. 2), transmission characteristics specific to the closed space, and the like are considered. In such a case, a position of a speaker is estimated in advance, the microphone mC that is likely to be able to clearly collect the voice of the occupant D next to the microphone mD is used, and a voice in which the crosstalk component is suppressed from a voice collected by the microphone mC is output. It is expected that the voice recognition can be enhanced by performing the voice recognition on the voice after the crosstalk suppression.

Therefore, in the following embodiments, an example of an acoustic crosstalk suppression device that improves performance by dynamically changing the main signal and the reference signal when a suppression amount of the crosstalk component or a voice recognition result is unexpected will be described.

Hereinafter, embodiments specifically disclosing an acoustic crosstalk suppression device and an acoustic crosstalk suppression method according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding by those skilled in the art. The accompanying drawings and the following description are provided for a thorough understanding of the present disclosure for those skilled in the art, and are not intended to limit the subject matter in the claims.

First Embodiment

FIG. 1 is a diagram showing an arrangement example of occupants and microphones in a vehicle cabin 108z of a vehicle 108 in which an acoustic crosstalk suppression device 105 according to a first embodiment is mounted. The vehicle 108 is a minivan of up to 7 to 8 people including, for example, a driver seat, a front passenger seat, a rear seat in a second row, and a rear seat in a third row in the vehicle cabin 108z. It should be noted that the vehicle 108 is not limited to the minivan of up to 7 to 8 passengers, and for example, a passenger car or a bus of 5 passengers may be adopted, particularly, the number of passengers or a vehicle type is not limited.

In FIG. 1, the microphone mA is disposed in front of the driver seat on which the occupant A corresponding to a driver of the vehicle 108 is seated. The microphone mB is disposed in front of the front passenger seat. For example, the microphone mC is disposed in front of a right side of the rear seat in the third row. For example, the microphone mD is disposed in front of a left side of the rear seat in the third row on which the occupant D is seated. The number and arrangement of the occupants can be optionally changed. Further, the microphones may be arranged, for example, in front of left and right sides of the rear seat in the second row. The number of microphones arranged in the vehicle cabin 108z of the vehicle 108 is not limited to four, and may be, for example, three or five or more.

The microphone mA is a microphone for mainly collecting the voice uttered by the occupant A. The microphone mD is a microphone for mainly collecting the voice uttered by the occupant D. Although FIG. 1 shows an example in which no occupant is seated on the front passenger seat, the rear seat in the second row, and on the right side of the rear seat in the third row in order to facilitate understanding of the description, occupants may be seated on the respective seats.

The microphones mA, mB, mC, and mD may be, for example, either directional microphones or non-directional microphones. Further, the microphones mA, mB, mC, and mD each may be configured with, for example, a single body of a high-quality and small-sized electret condenser microphone (ECM), a microphone array configured with a plurality of ECMs, or the like. The microphones mA, mB, mC, and mD are connected to the acoustic crosstalk suppression device 105, but wiring between the microphones mA, mB, mC, and mD and the acoustic crosstalk suppression device 105 is not illustrated in order to avoid complication of FIG. 1.

The acoustic crosstalk suppression device 105 includes a housing that houses various electronic components, and is disposed, for example, inside a dashboard in the vehicle cabin 108z of the vehicle 108. The acoustic crosstalk suppression device 105 suppresses a voice (a so-called crosstalk component) uttered by an occupant other than an occupant that is a voice recognition target among voices collected by the microphones. The voice uttered by the occupant who is not the voice recognition target becomes a crosstalk component included in the voice that is the voice recognition target with respect to the voice uttered by the occupant who is the voice recognition target. For example, a crosstalk component included in a sound collected by the microphone mD for collecting the voice uttered by the occupant D is a voice uttered by the occupant A and collected by the microphone mD.

Figure 2:
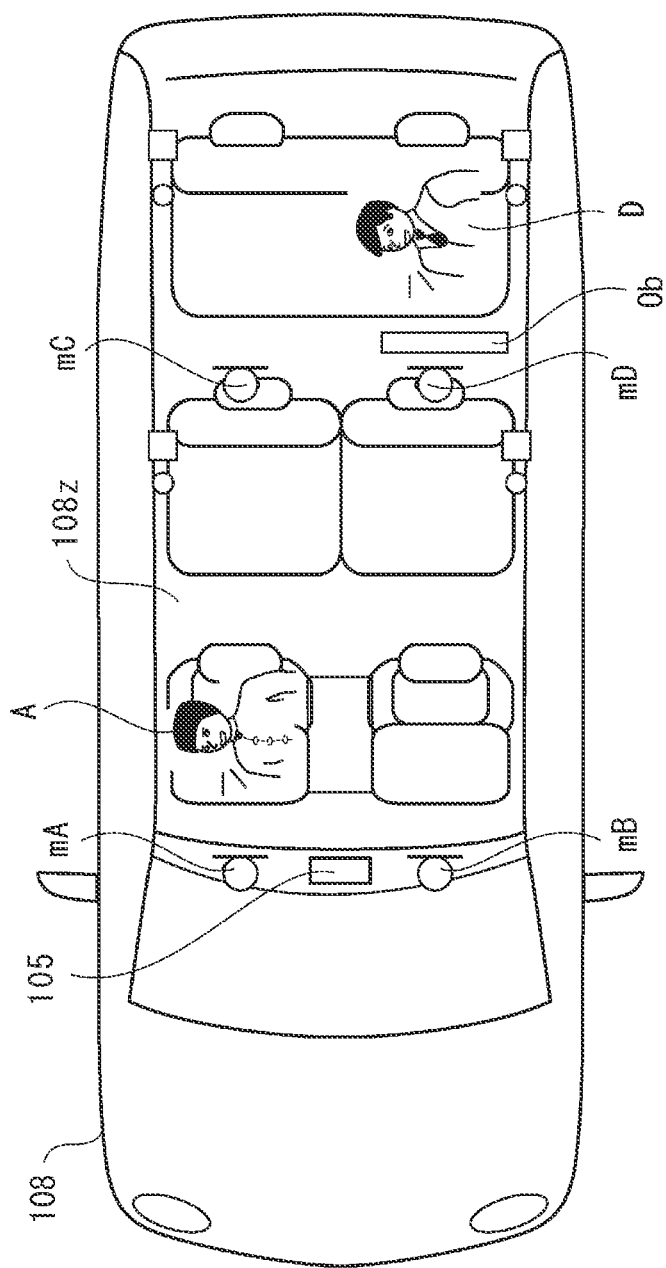
FIG. 2 is a diagram showing an example of a situation in the vehicle cabin when an obstacle is present between a mouth of an occupant D and a microphone mD.

FIG. 2 is a diagram showing an example of a situation in the vehicle cabin 108z when an obstacle Ob is present between the mouth of the occupant D and the microphone mD. In a case where the obstacle Ob is present between the mouth of the occupant D and the microphone mD, the microphone mD cannot clearly collect the voice when the occupant D utters due to an influence of reflection or the like at the obstacle Ob. In other words, a voice signal collected by the microphone mD is not suitable as a voice signal (main signal) when the occupant D who is the voice recognition target utters. In this case, for example, there is a possibility that the microphone mC disposed near (for example, adjacent to) the microphone mD can clearly collect the voice of the occupant D. In other words, there is a high possibility that a voice signal collected by the microphone mC is suitable as a voice signal (main signal) when the occupant D who is the voice recognition target utters.

Configuration of Acoustic Crosstalk Suppression Device

Figure 3:
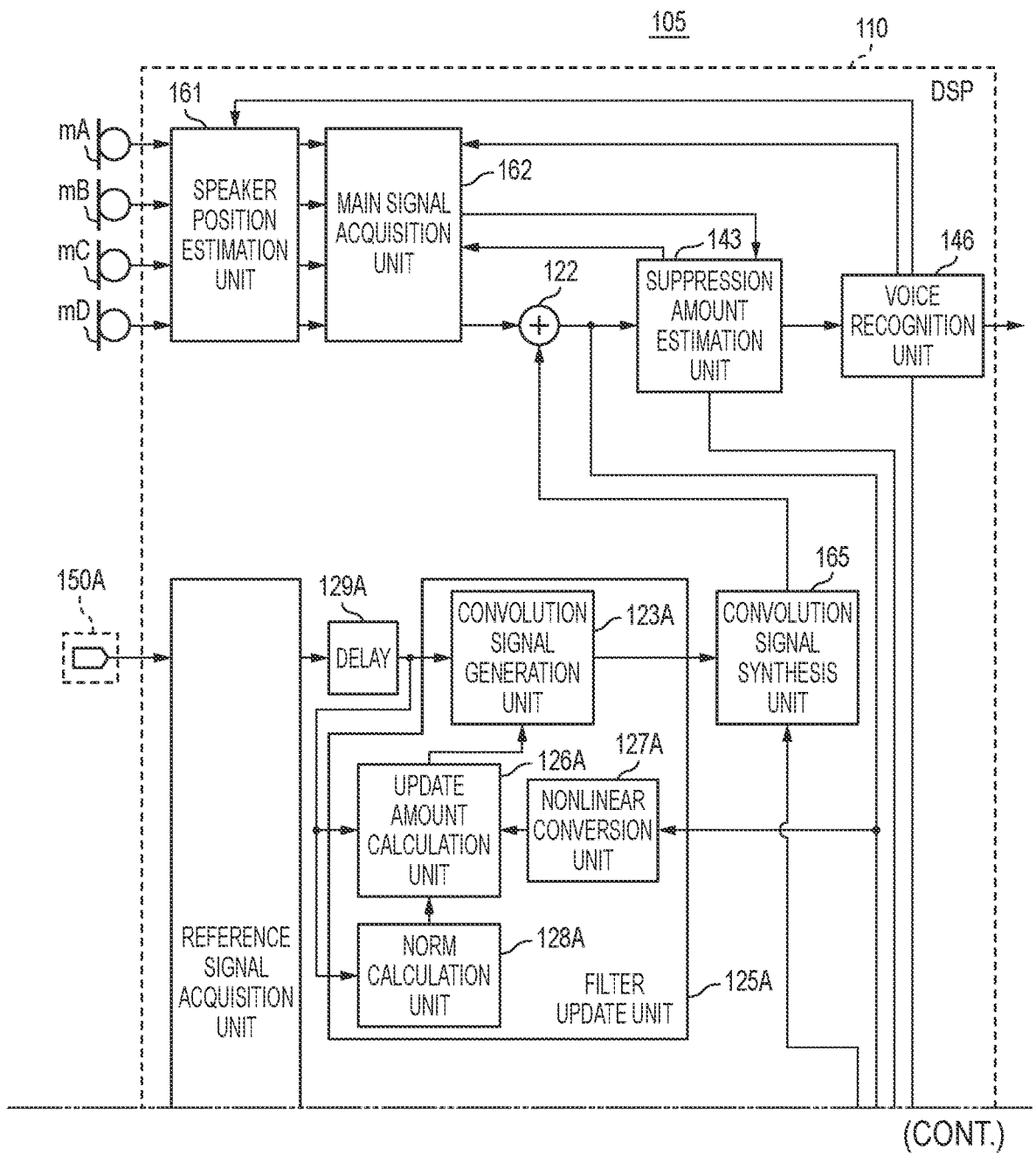
FIG. 3 is a block diagram showing a functional configuration example of the acoustic crosstalk suppression device according to the first embodiment.

FIG. 3 is a block diagram showing a functional configuration example of the acoustic crosstalk suppression device 105 according to the first embodiment. The acoustic crosstalk suppression device 105 generates crosstalk suppression signals (examples of a suppression signal) in which crosstalk caused by the utterance of the occupant A and collected by the microphone mD is reproduced by performing convolution processings on voice signals of the voice uttered by the occupant A, collected by the microphones mA, mB, and mC, and included in the voice signal of the voice uttered by the occupant D who wants to perform the voice recognition and collected by the microphone mD. The acoustic crosstalk suppression device 105 synthesizes these crosstalk suppression signals by selectively combining them. The acoustic crosstalk suppression device 105 generates a voice signal after suppression of the crosstalk component by suppressing (specifically, removing or subtracting) the synthesized crosstalk suppression signal of the occupant A from the voice signal collected by the microphone mD. Here, a voice signal generated by utterance of a main occupant who is a voice recognition target by the acoustic crosstalk suppression device 105 is referred to as a main signal, and an original voice signal from which the crosstalk suppression signal is generated (that is, a voice signal generated by utterance of another occupant other than the main occupant who is an utterance source of the crosstalk component) is referred to as a reference signal.

The acoustic crosstalk suppression device 105 is configured with, for example, a digital signal processor (DSP) 110 and memories 150A, 150B, 150C, 150D, and 152 as a hardware configuration. The acoustic crosstalk suppression device 105 may include the microphones mA, mB, mC, and mD in addition to the DSP 110 and the memories 150A, 150B, 150C, 150D, and 152. Further, although the acoustic crosstalk suppression device 105 for the microphone mD is exemplified here, the same applies to the acoustic crosstalk suppression device 105 for the microphone mA. That is, description will be given by exemplifying the voice signal of the main occupant D collected by the microphone mD as the main signal (one) and the voice signals of the occupant A collected by the microphones mA, mB, and mC as the reference signals (three), but conversely, the voice signal of the main occupant A collected by the microphone mA may be the main signal (one) and the voice signals of the sub-occupant D collected by the microphones mD, mB, mC may be the reference signals (three).

The memory 150A stores, as the reference signal, for example, the voice signal of the voice uttered by the sub-occupant A and collected by the microphone mA.

The memory 150B stores, as the reference signal, for example, the voice signal of the voice uttered by the sub-occupant A and collected by the microphone mB.

The memory 150C stores, as the reference signal, for example, the voice signal of the voice uttered by the sub-occupant A and collected by the microphone mC.

The memory 150D can also hold, as the reference signal, for example, the voice signal of the voice uttered by the sub-occupant A and collected by the microphone mD.

The memory 152 includes a random access memory (RAM) as a work memory of the acoustic crosstalk suppression device 105, and a read only memory (ROM) that stores a program related to a processing of the acoustic crosstalk suppression device 105. The memory 152 stores a voice recognition result by a voice recognition unit 146 (including, for example, voice recognition data and a score value) and filter coefficients as examples of update results updated by filter update units 125A, 125B, 125C, and 125D. The voice recognition data is, for example, text data in which content of the voice uttered by the main occupant D (an example of a main speaker) is converted into text. The score value is an evaluation value indicating reliability (accuracy) of text data that is a processing result of voice recognition performed by the voice recognition unit 146. For example, when the score value exceeds a predetermined value, it is determined as success (OK), and when the score value is equal to or smaller than the predetermined value, it is determined as failure (NG).

The DSP 110 is, for example, a processor that performs a processing of suppressing a crosstalk component of the voice uttered by the sub-occupant D from the voice signal of the voice uttered by the main occupant D and collected by the microphone mD. Further, the DSP 110 performs a voice recognition processing on the voice signal after the suppression of the crosstalk component. Here, the DSP is used as the processor, but for example, a central processing unit (CPU), a graphical processing unit (GPU), or the like may be used. Further, a dedicated electronic circuit designed by an application specific integrated circuit (ASIC) or the like, or an electronic circuit designed to be reconfigurable, such as a field programmable gate array (FPGA), may be used.

The DSP 110 includes a speaker position estimation unit 161, a main signal acquisition unit 162, a reference signal acquisition unit 166, an adder 122, the filter update units 125A, 125B, 125C, and 125D, delays 129A, 129B, 129C, and 129D, a convolution signal synthesis unit 165, a suppression amount estimation unit 143, and the voice recognition unit 146.

The speaker position estimation unit 161 as an example of a speaker estimation unit estimates a speaker position in the vehicle cabin 108z (that is, a position of an occupant who mainly utters) based on sound pressure levels of the voices collected by the four microphones mA, mB, mC, and mD. In this case, normally, when a sound pressure level of a voice collected by a microphone placed in front of an occupant is high by exceeding a predetermined threshold (sound pressure), the speaker position estimation unit 161 determines that the voice is uttered by the occupant. The main signal acquisition unit 162 selects and acquires the voice signal of the occupant as the main signal based on the determination result. However, when the obstacle Ob is present between the mouth of the occupant and the microphone (see FIG. 2), due to transmission characteristics such as reflection specific to the closed space in the vehicle cabin 108z, a sound pressure level of a voice uttered by the occupant and collected by another microphone (for example, another microphone placed near the microphone placed in front of the occupant) may become higher than that of the microphone placed in front of the occupant. In a case where such a situation is grasped in advance, when the sound pressure level of the voice collected by the other microphone becomes higher than the sound pressure level of the voice collected by the microphone placed in front of the occupant, the speaker position estimation unit 161 may estimate a speaker position as utterance of the occupant.

The speaker position estimation unit 161 may input a captured image by a camera (not shown) in the vehicle cabin 108z that captures an image of an occupant, perform face recognition on the captured image, identify, for example, an occupant who opens a mouth as a speaker, and estimate a speaker position. Further, the speaker position estimation unit 161 may estimate the speaker position with high accuracy based on both the sound pressure level of the voice collected by each microphone and the captured image of the occupant by the camera (not shown). Further, the speaker position estimation unit 161 may estimate the speaker position based on a voice recognition result by the voice recognition unit 146. Further, the speaker position estimation unit 161 may acquire a voiceprint of each occupant in advance, register data of each voiceprint and a seat position of an occupant corresponding to the voiceprint in the memory 152, compare a voiceprint of a voice collected by each microphone with the voiceprint registered in the memory 152, and estimate the seat position of the speaker as the speaker position when the voiceprints match.

The main signal acquisition unit 162 as an example of a main signal acquisition unit inputs the voice signals of the voices collected by the four microphones mA, mB, mC, and mD. The main signal acquisition unit 162 selects and acquires, as the main signal, a voice signal of a voice collected by any one of the microphones from among voices uttered by the occupant at the speaker position based on an estimation result of the speaker position estimation unit 161. The main signal acquisition unit 162 stores, in the memory 152, identification information related to the microphone that collects the voice signal selected as the main signal. A voice of the main signal is normally a voice having the highest sound pressure level of the voice collected by the microphone placed in front of the occupant, but when the voice is blocked by the obstacle Ob or the like and sound quality is not good as a result of the voice recognition, the voice of the main signal may be a voice that has a high sound pressure level and that is collected by the other microphone (for example, the other microphone placed near the microphone placed in front of the occupant) instead of the microphone placed in front of the occupant. That is, the main signal acquisition unit 162 can switch the voice of the voice signal, which is the main signal collected by each microphone, based on an estimation result of the speaker position estimation unit 161. The main signal acquisition unit 162 uses the voice signal of the largest voice as the main signal, but for example, the voice signal of the occupant that is the main signal may be fixed in advance.

The reference signal acquisition unit 166 inputs the voice signals of the voices collected by the four microphones mA, mB, mC, and mD. The reference signal acquisition unit 166 refers to the identification information stored in the memory 152 (that is, the identification information related to the microphone that collects the voice signal selected as the main signal), and acquires the voice signals of the voices collected by a plurality of microphones not selected as the main signal as the reference signals. Further, the reference signal acquisition unit 166 selects a combination of the reference signals. For example, in a configuration of FIG. 3, when a parameter n (n: an integer equal to or larger than 3) corresponding to the number of arranged microphones is "4", the reference signal acquisition unit 166 may use a combination of the reference signals collected by the three microphones (specifically, the microphone mA, the microphone mB, and the microphone mC) corresponding to (n-1), or may use a combination of the reference signals collected by the two microphones (specifically, the microphone mA and the microphone mB, the microphone mA and the microphone mC, or the microphone mB and the microphone mC) corresponding to (n-2).

Further, the reference signal acquisition unit 166 may select a reference signal collected by any one of the microphones mA, mB, and mC. A voice of the reference signal normally includes the voice collected by the microphone placed in front of the occupant A, but when the voice is blocked by the obstacle Ob or the like and sound quality is not good as a result of the voice recognition, the voice of the reference signal may be only the voice collected by the other microphone without including the voice collected by the microphone placed in front of the occupant.

The adder 122 as an example of a crosstalk suppression unit suppresses a crosstalk component included in the voice uttered by the main occupant D and collected by the microphone mD by subtracting a crosstalk synthesis suppression signal in which crosstalk suppression signals generated by the filter update units 125A, 125B, and 125C are synthesized from, for example, the voice signal of the voice uttered by the main occupant D and collected by the microphone mD. As described above, the processing performed by the adder 122 is strictly subtraction, but even the processing of subtracting the crosstalk synthesis suppression signal can be considered to be substantially equivalent to the processing of inverting the crosstalk synthesis suppression signal and then adding the inverted crosstalk synthesis suppression signal in the adder 122. Therefore, in the present specification, the suppression processing of the crosstalk component is described as a processing performed by the adder 122 or an adder 222 described later.

Processings of the filter update units 125A, 125B, 125C, and 125D will be described in detail. The crosstalk component suppressed by the acoustic crosstalk suppression device 105 is, for example, a voice in which the voice uttered by another occupant A who is not the voice recognition target reaches the microphone mD disposed in front of the occupant D who is the voice recognition target. The voice reaches the microphone mD via a transmission path in the vehicle cabin 108z. Therefore, the voice collected by the microphone mD is a voice mixed with the voice uttered by the occupant D with a time lag (so-called delay time) required for the voice uttered by the occupant A to pass through the transmission path.

Each of the filter update units 125A, 125B, and 125C generates a crosstalk suppression signal for suppressing (subtracting) a crosstalk component included in the voice collected by the microphone mD, for example, based on a voice signal after suppression of the crosstalk component collected by the microphone mD and the reference signals collected by the microphones mA, mB, and mC and shifted by different delay times. The filter update units 125A, 125B, 125C, and 125D include convolution signal generation units 123A, 123B, 123C, and 123D, filter coefficient monitoring units 141A, 141B, 141C, and 141D, update amount calculation units 126A, 126B, 126C, and 126D, nonlinear conversion units 127A, 127B, 127C, and 127D, and norm calculation units 128A, 128B, 128C, and 128D.

Since the filter update units 125A, 125B, 125C, and 125D have the same configuration, a configuration of the filter update unit 125A will be described here by way of example, and description of other filter update units 125B, 125C, and 125D will be simplified. For example, in the following description of the filter update unit 125A, characters "A" in reference numerals of the "convolution signal generation unit 123A", the "update amount calculation unit 126A", the "nonlinear conversion unit 127A", and the "norm calculation unit 128A" provided in the filter update unit 125A may be replaced with "B", "C", and "D" as appropriate. That is, each of the filter update unit 125B, the filter update unit 125C, and the filter update unit 125D has the same configuration as that of the filter update unit 125A.

The convolution signal generation unit 123A as an example of a filter is configured with, for example, an adaptive filter, performs a convolution processing on the reference signal by using a filter coefficient (an example of a parameter) calculated by the update amount calculation unit 126A, and performs a processing of generating a crosstalk suppression signal from the reference signal. As the adaptive filter, for example, a finite impulse response (FIR) filter described in Patent Literature 1, JP-A-2007-19595, or the like is used. The adaptive filter reproduces transmission characteristics between the microphone mD and the microphone mA, and generates a crosstalk suppression signal by processing the reference signal. However, since the transmission characteristics in the vehicle cabin 108z are not steady, characteristics of the adaptive filter also need to be changed at any time. In the first embodiment, the characteristics of the adaptive filter are changed so as to approach latest transmission characteristics between the microphone mD and the microphone mA by controlling a coefficient or the number of taps of the adaptive filter. Hereinafter, an update of the adaptive filter may be referred to as learning.

A voice of the sub-occupant A collected by the microphone mD is delayed with respect to a voice of the sub-occupant A collected by the microphone mA by time during which the voice is transmitted from the microphone mA to the microphone mD. Since the reference signal is collected by the microphone mA and stored in the memory 150A, the delay time from the microphone mA to the microphone mD is not reflected. Therefore, in the first embodiment, the delay 129A as a delay device absorbs the time difference. That is, the delay 129A performs a delay processing on the reference signal by the time difference described above (in short, the time required for the transmission path of the voice from the microphone mA to the microphone mD), and outputs the reference signal to the filter update unit 125A. Accordingly, the filter update unit 125A can obtain the reference signal that matches a timing at which the voice is collected by the microphone mD. In each of the filter update units 125B and 125C, each of the delays 129B and 129C absorbs a time difference of delay time from the microphone mB to the microphone mD and a time difference of delay time from the microphone mC to the microphone mD. In the filter update unit 125D, when the voice signal collected by the microphone mD is used as the reference signal, the delay 129D absorbs the same time difference of the delay time. A value of the delay 129A can be obtained by approximately measuring a distance between the microphone mA and the microphone mD and dividing the distance by a sound velocity. For example, when the sound velocity based on a temperature in the vehicle cabin 108z is 340 m/s and the distance between the microphone mA and the microphone mD is about 3.4 m, the value of the delay 129A is about 10 msec.

More precisely, the value of the delay 129A (delay time) is different for each reference signal, and is obtained as follows. For example, it is assumed that the microphone mA is disposed in front of the occupant A and the microphone mD is disposed in front of the occupant D in the vehicle cabin 108z. In a case where the occupant A utters and the voice of the occupant A included in the microphone mD is suppressed, when the voice collected by the microphone mA is used as the reference signal, the value of the delay 129A is calculated based on a difference between a distance from a mouth of the occupant A to the microphone mA and a distance from the mouth of the occupant A to the microphone mD. In contrast, in a case where the occupant D utters and the voice of the occupant D included in the microphone mA is suppressed, when the voice collected by the microphone mD is used as the reference signal, the value of the delay 129D is calculated based on a difference between a distance from a mouth of the occupant D to the microphone mD and a distance from the mouth of the occupant D to the microphone mA.

The nonlinear conversion unit 127A performs nonlinear conversion on a voice signal after the suppression of the crosstalk component. The nonlinear conversion is a processing of converting the voice signal after the suppression of the crosstalk component into information indicating a direction (positive or negative) in which the adaptive filter is to be updated. The nonlinear conversion unit 127A outputs the signal after the nonlinear conversion to the update amount calculation unit 126A.

The norm calculation unit 128A calculates a norm of the voice signal of the voice collected by the microphone mA. The norm of the voice signal is a sum of magnitudes of voice signals within a predetermined time in the past, and is a value indicating a degree of a magnitude of a signal within this time. The update amount calculation unit 126A uses the norm in order to normalize an influence of a sound volume of a voice collected by the microphone mA in the past. Generally, since an update amount of the adaptive filter may be calculated to be larger as the sound volume is larger, the characteristics of the adaptive filter may be excessively influenced by characteristics of a large voice without performing the normalization. In the first embodiment, the update amount of the adaptive filter is stabilized by normalizing the voice signal output from the delay 129A by using the norm calculated by the norm calculation unit 128A.

The update amount calculation unit 126A calculates an update amount of the filter characteristics of the convolution signal generation unit 123A (specifically, an update amount of the coefficient or the number of taps of the adaptive filter) by using signals received from the nonlinear conversion unit 127A, the norm calculation unit 128A and the delay 129A. The update amount calculation unit 126A normalizes the voice signal of the voice collected by the microphone mA via the delay 129A based on the norm calculated by the norm calculation unit 128A. The update amount calculation unit 126A determines an update amount by adding positive or negative information based on information obtained from the nonlinear conversion unit 127A to a result of normalizing the voice signal of the voice collected by the microphone mA. In the first embodiment, the update amount calculation unit 126A calculates the update amount of the filter characteristics by independent component analysis (ICA). Here, a case where the update amount calculation unit updates the coefficient of the adaptive filter (hereinafter, referred to as a filter coefficient) is shown, but the number of taps may be updated instead of the filter coefficient or together with the filter coefficient.

The filter update unit 125A brings the characteristics of the convolution signal generation unit 123A close to the transmission characteristics between the microphone mA and the microphone mD by executing the processings of the update amount calculation unit 126A, the nonlinear conversion unit 127A, and the norm calculation unit 128A at any time.

The convolution signal synthesis unit 165 as an example of a synthesis unit selects and synthesizes all or some of crosstalk suppression signals output from the three filter update units 125A, 125B, and 125C excluding the filter update unit (here, the filter update unit 125D) corresponding to the main signal among the four filter update units 125A, 125B, 125C, and 125D, and outputs a synthesis crosstalk suppression signal (an example of a synthesis suppression signal) to the adder 122. The convolution signal synthesis unit 165 may select and synthesize the crosstalk suppression signals output from the two filter update units (for example, the filter update units 125A and 125B) among the three filter update units 125A, 125B, and 125C. For example, the convolution signal synthesis unit 165 may synthesize crosstalk suppression signals output from a pair of the two filter update units 125A and 125B, a pair of the two filter update units 125A and 125C, or a pair of the two filter update units 125B and 125C. Further, the convolution signal synthesis unit 165 may output the crosstalk suppression signal from one of the filter update unit 125A, the filter update unit 125B, and the filter update unit 125C as it is.

Here, the convolution signal synthesis unit 165 does not synthesize the crosstalk suppression signal from the filter update unit 125D corresponding to the main signal, but the filter update unit 125D may be added, and all crosstalk suppression signals generated by the four filter update units 125A, 125B, 125C, and 125D may be synthesized or the crosstalk suppression signals generated by the four filter update units 125A, 125B, 125C, and 125D may be selected and synthesized in the same manner as described above. Further, the convolution signal synthesis unit 165 may output the crosstalk suppression signal from one filter update unit 125D as it is. In this case, in the filter update unit 125D, since the reference signal input to the convolution signal generation unit 123D is a voice uttered by the occupant A and collected by the microphone mA, it is considered that the crosstalk suppression signal output from the filter update unit 125D is the same as the crosstalk suppression signal output from the filter update unit 125A when filter coefficients are the same.

The suppression amount estimation unit 143 calculates a difference between the voice signal after the suppression of the crosstalk component output from the adder 122 and the voice signal of the voice collected by the microphone mD as a suppression amount, and outputs the difference to the main signal acquisition unit 162 and the reference signal acquisition unit 166.

The voice recognition unit 146 performs the voice recognition based on the voice signal after the suppression of the crosstalk component output from the adder 122, outputs voice recognition data (for example, text data) and an evaluation value (score value) as a voice recognition result, and stores the voice recognition data and the evaluation value in the memory 152. For example, when the voice recognition unit 146 is connected to a monitor (not shown, for example, a display of a car navigation device mounted on the vehicle 108), the voice recognition result is displayed on a screen as text. Further, when the voice recognition unit 146 is connected to a communication device, the voice recognition result is transmitted as communication data. Further, when the voice recognition unit 146 is connected to a speaker, the voice recognition result is output as voice.

Instead of including the voice recognition unit 146, the acoustic crosstalk suppression device 105 may include a communication unit connectable to a network, transmit voice data based on the voice signal after the suppression of the crosstalk component to a cloud server (not shown) via the network, perform the voice recognition by the cloud server, receive a voice recognition result from the cloud server, and output the voice recognition result to a monitor, a speaker, or the like.

Operation of Acoustic Crosstalk Suppression Device

Next, an operation of the acoustic crosstalk suppression device 105 according to the first embodiment will be described.

Here, a case where a voice uttered by the occupant D and collected by the microphone mD is set as the voice recognition target and the voice uttered by the occupant A and collected by the microphone mD is set as the crosstalk component is shown, and the voice uttered by the occupant A and collected by the microphone mA may be set as the voice recognition target and a voice uttered by the occupant D and collected by the microphone mA may be set as the crosstalk component.

Figure 4:
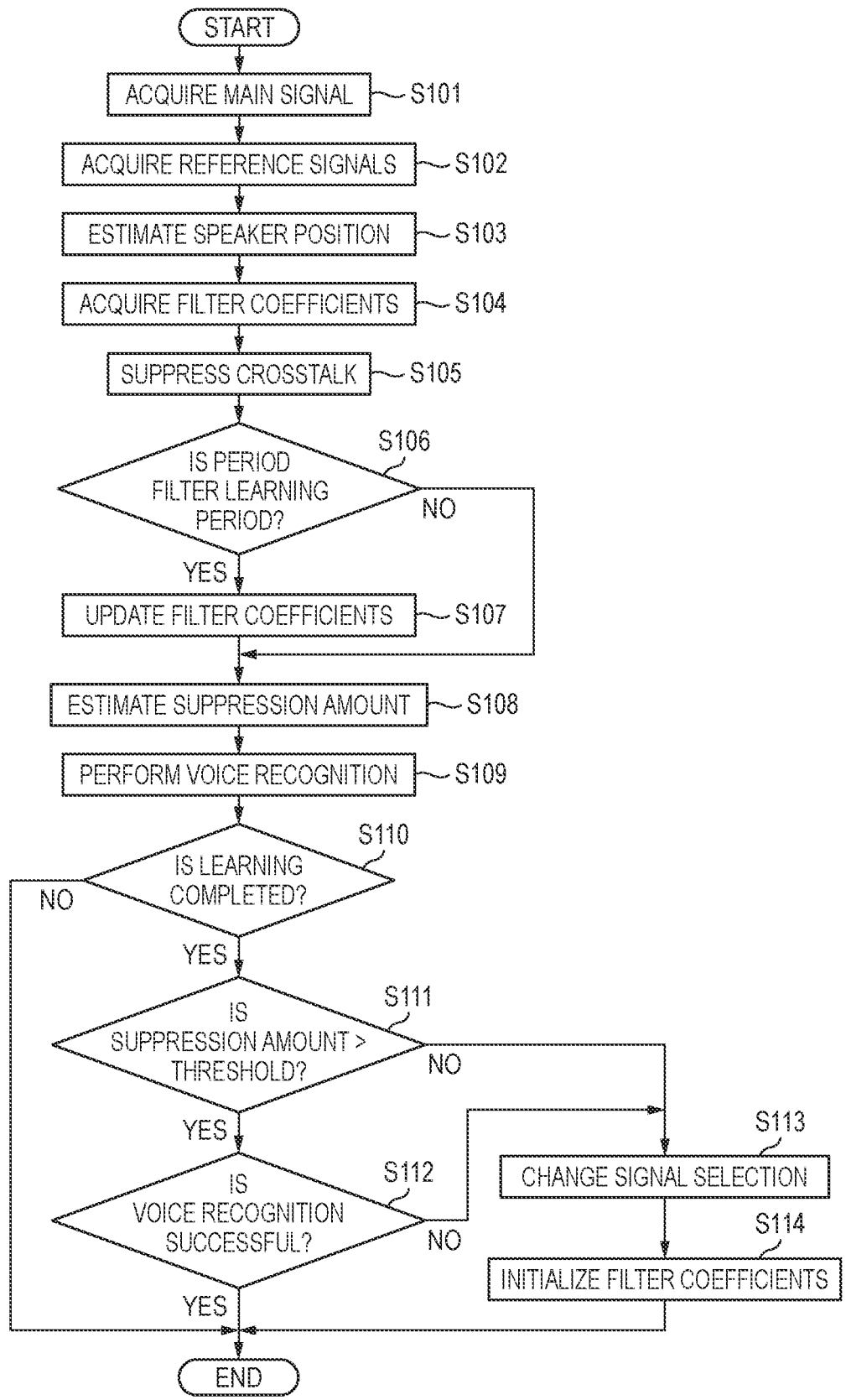
FIG. 4 is a flowchart showing an example of an operation procedure of the acoustic crosstalk suppression device according to the first embodiment.

FIG. 4 is a flowchart showing an example of an operation procedure of the acoustic crosstalk suppression device 105 according to the first embodiment. A processing of FIG. 4 is executed by the DSP 110 that constitutes the acoustic crosstalk suppression device 105, and is repeatedly executed for each sample of the voice signal of the voice collected by the microphone mD and input to the acoustic crosstalk suppression device 105.

In FIG. 4, the main signal acquisition unit 162 acquires a voice signal of a voice collected by, for example, the microphone mD at a highest sound pressure level among the four microphones mA, mB, mC, and mD as the main signal to be subjected to the voice recognition (S101).

The reference signal acquisition unit 166 acquires, as the reference signals, voice signals of voices collected by maximum three microphones mA, mB, and mC other than the microphone mD serving as the main signal (S102). Further, voice data of the voices collected by the microphones mA, mB, and mC is stored in the memories 150A, 150B, and 150C by the DSP 110.

The speaker position estimation unit 161 inputs the voice signals of the voices collected by the four microphones mA, mB, mC, and mD, and estimates a speaker position based on sound pressure levels of the voice signals (S103). Here, the speaker position is estimated to be the occupant D based on the sound pressure level of the voice signal when the occupant D utters, but when the occupant A utters, the speaker position may be the occupant A.

The filter update units 125A, 125B, and 125C read corresponding filter coefficients stored in the memory 152 and set the filter coefficients in the convolution signal generation units 123A, 123B, and 123C, respectively (S104). For example, the filter update unit 125D may read a corresponding filter coefficient stored in the memory 152 and set the filter coefficient in the convolution signal generation unit 123D.

The filter update units 125A, 125B, and 125C generate crosstalk suppression signals by using reference signals that are collected by the microphones mA, mB, and mC and on which a delay processing is performed by the delays 129A, 129B, and 129C, respectively. That is, the convolution signal generation units 123A, 123B, and 123C perform a convolution processing on reference signals shifted by the delay time by using the corresponding filter coefficients stored in the memory 152 or filter coefficients calculated by the update amount calculation units 126A, 126B, and 126C, and generate crosstalk suppression signals from the reference signals shifted by the delay time. Further, the convolution signal synthesis unit 165 synthesizes the crosstalk suppression signals in accordance with a combination of the reference signals. The adder 122 subtracts the synthesis crosstalk suppression signal generated by the convolution signal synthesis unit 165 from the voice signal of the voice collected by the microphone mD, and suppresses crosstalk included in the voice collected by the microphone mD (S105).

The DSP 110 determines whether a period is a filter learning period (S106). The filter learning period is a period during which at least the occupant A who is an utterance source of the crosstalk component utters with the occupant D who is the voice recognition target. Further, a period that is not the filter learning period is a period during which the occupant A, who is the utterance source of the crosstalk component, does not utter. In a case of the filter learning period, the filter update units 125A, 125B, and 125C update the filter coefficients of the convolution signal generation units 123A, 123B, and 123C with the filter coefficients calculated by the update amount calculation units 126A, 126B, and 126C, and store the updated filter coefficients in the memory 152 (S107). In contrast, when a period is not the filter learning period, the DSP 110 proceeds to a processing of step S108.

The suppression amount estimation unit 143 calculates a difference between the voice signal after the crosstalk suppression output from the adder 122 and the voice signal of the voice collected by the microphone mD as a suppression amount (S108).

The voice recognition unit 146 performs voice recognition based on the voice signal after the crosstalk suppression output from the adder 122, outputs voice recognition data and a score value as a voice recognition result, and stores the voice recognition data and the score value in the memory 152 (S109).

Each of the filter update units 125A, 125B, and 125C determines whether the learning of the filter coefficient is completed (S110). Here, when a variation width of the filter coefficient in a predetermined period is within a second threshold, it is determined that the learning of the filter coefficient is completed. When at least one of the filter coefficients of the filter update units 125A, 125B, and 125C does not converge, the DSP 110 determines that the learning of the filter coefficients is not completed, and ends the processing shown in FIG. 4. In contrast, when all the filter coefficients of the filter update units 125A, 125B, and 125C converge, it is determined that the learning of the filter coefficients is completed.

The suppression amount estimation unit 143 determines whether the suppression amount calculated in step S108 exceeds a first threshold (S111). When the suppression amount exceeds the first threshold, the voice recognition unit 146 determines whether the voice recognition succeeds or fails in S109 (S112). When the voice recognition succeeds, the DSP 110 ends the processing shown in FIG. 4.

In contrast, when the suppression amount is equal to or smaller than the first threshold in step S111 or when the voice recognition fails in step S112, the DSP 110 changes the main signal or the combination of the reference signals (S113). The reference signal acquisition unit 166 changes the combination of the reference signals of the voices respectively collected by the microphone mA, the microphone mB, and the microphone mC. Further, the main signal acquisition unit 162 may switch, as the main signal, for example, the voice signal of the voice of the occupant D collected by the microphone mD to the voice signal of the voice of the occupant D collected by the microphone mC disposed in the vicinity of the occupant D. The main signal is not limited to the voice signal of the occupant D collected by the microphone mC, and may be switched to the voice signal of the occupant D collected by the microphone mA or the voice signal of the occupant D collected by the microphone mB. Further, when the sound pressure level of the voice uttered by the occupant A is higher than the sound pressure level of the voice uttered by the occupant D, the main signal may be switched from the voice signal of the voice uttered by the occupant D to the voice signal of the voice uttered by the occupant A.

Here, when the main signal or the combination of the reference signals is changed, that is, when the suppression amount is equal to or smaller than the first threshold in step S111 or when the voice recognition fails in step S112, the reference signal acquisition unit 166 changes the combination of the reference signals prior to the main signal acquisition unit 162. Then, even when the combination of all the reference signals is changed, in a case where a state where the suppression amount is equal to or smaller than the first threshold or the voice recognition fails continues, the main signal acquisition unit 162 changes the main signal. Even when the main signal acquisition unit 162 changes the main signal prior to the reference signal acquisition unit 166 and changes all main signals, in the case where the state where the suppression amount is equal to or smaller than the first threshold or the voice recognition fails continues, the reference signal acquisition unit 166 may change the combination of the reference signals.

The reference signal acquisition unit 166 first sets the combination of the reference signals used for generating the synthesis crosstalk suppression signal as the combination of the maximum number of reference signals collected by the maximum three microphones, and then replaces the combination of the reference signals with a combination of other reference signals in a direction in which the number of reference signals is reduced. Accordingly, by starting the suppression of the crosstalk with the combination of the maximum number of reference signals considered to have the highest suppression performance of the crosstalk component, it is possible to suppress the crosstalk component with a desired suppression amount quickly, and to cause the filter coefficient of the filter update unit to converge. Further, when the number of combinations of the reference signals is the same, for example, the combination of the reference signals may be configured so as to preferentially include the reference signal of the voice collected by a microphone having a high sound pressure level or a microphone disposed in front of the occupant A who is another speaker.

When the combination of the reference signals is changed, the reference signal acquisition unit 166, based on a past detection result, that is, may set a priority order of a combination of reference signals in which the voice recognition result is successful or the suppression amount is equal to or larger than the first threshold to be high, hold the priority order in the memory 152 as database, and select the combination of the reference signals in accordance with the registered priority order based on the reference signals collected by the microphones. Further, the reference signal acquisition unit 166 may compare cross-correlations or frequency characteristics of the reference signals collected by the microphones, and learn a combination of the reference signals in which the voice recognition result is successful or the suppression amount is equal to or larger than the first threshold in real time based on a comparison result thereof.

The acoustic crosstalk suppression device 105 determines the suppression performance of the crosstalk component based on at least one of the suppression amount calculated by the suppression amount estimation unit 143 and the voice recognition result of the voice recognition unit 146. However, the present invention is not limited thereto. For example, the acoustic crosstalk suppression device 105 may perform the determination based on a degree of convergence of a filter coefficient capable of evaluating sound quality.

When the main signal or the combination of the reference signals is changed in step S113, the filter update units 125A, 125B, and 125C initialize the filter coefficients (S114). When the filter coefficients are initialized, the DSP 110 ends the processing shown in FIG. 4. Thereafter, each of the filter update units 125A, 125B, and 125C resumes learning of the filter coefficient in the next sample.

In the acoustic crosstalk suppression device 105 according to the first embodiment, when the voice signal of the voice uttered by the occupant D who is the voice recognition target is set as the main signal, and the voice signals of the voice uttered by the occupant A and collected by the microphone mA, the microphone mB, and the microphone mC are set as the reference signals, the crosstalk component caused by the voice uttered by the occupant A, which is included in the main signal of the voice uttered by the occupant D, can be effectively suppressed using the plurality of reference signals. Further, the acoustic crosstalk suppression device 105 can adaptively suppress the crosstalk component included in the main signal by dynamically changing the main signal or the combination of the reference signals. Therefore, the sound quality of the uttered voice of the occupant D can be improved.

In this way, the acoustic crosstalk suppression device 105 estimates, by the speaker position estimation unit 161, the occupant D in the vehicle cabin 108$z$ based on the voice signals collected by the four microphones mA, mB, mC, and mD arranged in the vehicle cabin 108$z$ corresponding to the seats on which the four occupants can be seated. The acoustic crosstalk suppression device 105 includes the convolution signal generation units 123A, 123B, 123C, and 123D that generate the crosstalk suppression signals of the crosstalk component caused by the utterance of the occupant A (an example of the other speaker) and included in the voice signal of the voice uttered by the occupant D, and updates the filter coefficients (parameters) of the convolution signal generation units 123A, 123B, 123C, and 123D for suppressing the crosstalk component and stores update results by the four corresponding filter update units 125A, 125B, 125C, and 125D. The acoustic crosstalk suppression device 105 suppresses, by the adder 122, the crosstalk component included in the voice signal of the occupant D by using the synthesis crosstalk suppression signal based on the crosstalk suppression signals generated by the maximum three filter update units 125A, 125B, and 125C corresponding to the reference signals collected by the maximum three microphones other than the microphone corresponding to the occupant D.

Accordingly, the acoustic crosstalk suppression device 105 can effectively suppress the crosstalk component caused by the voice uttered by the occupant A, which is included in the voice signal (an example of the main signal) of the voice uttered by the occupant D by using the plurality of reference signals. Further, the acoustic crosstalk suppression device 105 can adaptively suppress the crosstalk component included in the main signal by dynamically changing the main signal or the combination of the reference signals. Therefore, the acoustic crosstalk suppression device 105 can adaptively suppress the acoustic crosstalk component that may be included in the uttered voice of the main speaker present in the closed space such as the vehicle cabin 108$z$, and can improve the sound quality of the uttered voice of the main speaker.

The acoustic crosstalk suppression device 105 further includes the convolution signal synthesis unit 165 that synthesizes the crosstalk suppression signals generated by the maximum three filter update units 125A, 125B, and 125C to generate the synthesis crosstalk suppression signal. Accordingly, the acoustic crosstalk suppression device 105 can suppress the crosstalk component by using all the crosstalk suppression signals generated by the maximum three filter update units 125A, 125B, and 125C corresponding to the maximum three microphones. Therefore, improvement of the suppression performance of the crosstalk component can be expected.

The convolution signal generation units 123A, 123B, and 123C provided in the maximum three filter update units 125A, 125B, and 125C generate the crosstalk suppression signals by using stored latest filter coefficients. Accordingly, the acoustic crosstalk suppression device 105 can generate the crosstalk suppression signal that reflects a situation closest to a current situation in the vehicle cabin 108$z$. Therefore, the suppression performance of the crosstalk component is improved.

The filter update unit 125A corresponding to the reference signal collected by the microphone mA corresponding to the occupant A who is the utterance source of the crosstalk component updates the filter coefficient of the convolution signal generation unit 123A included in the filter update unit 125A by using the reference signal, and stores an update result thereof in the memory 152. Accordingly, the filter update unit can adaptively update the filter coefficient by using the reference signal of the voice collected by the corresponding microphone.

The acoustic crosstalk suppression device 105 further includes the suppression amount estimation unit 143 that estimates the suppression amount of the crosstalk component, and the main signal acquisition unit 162 that replaces, as the voice signal of the occupant D, the voice signal collected by another microphone mA, another microphone mB, or another microphone mC arranged in the vicinity of the occupant D among the four microphones mA, mB, mC, and mD when it is determined that the suppression amount is equal to or smaller than the first threshold. Accordingly, when the suppression amount of the crosstalk component is small, the acoustic crosstalk suppression device 105 can increase the suppression amount of the crosstalk component by setting the voice signal of the voice of the occupant D collected by the other microphone disposed in the vicinity of the occupant D as the main signal. Therefore, desired suppression of the crosstalk component can be expected regardless of a situation in the vehicle cabin 108z such as the transmission characteristics specific to the closed space in the vehicle cabin 108z in which the obstacle Ob is present between the microphone placed in front of the occupant D who is a speaker and the mouth of the occupant.

The acoustic crosstalk suppression device 105 further includes the suppression amount estimation unit 143 that estimates the suppression amount of the crosstalk component, and the reference signal acquisition unit 166 that replaces the combination of the reference signals used to generate the synthesis crosstalk suppression signal with a combination of other reference signals when it is determined that the suppression amount is equal to or smaller than the first threshold. The filter update units corresponding to other reference signals after the replacement regenerates the crosstalk suppression signals based on the input other reference signals. Accordingly, even when the suppression amount of the crosstalk component is small, the acoustic crosstalk suppression device 105 can increase the suppression amount of the crosstalk component by changing the combination of the reference signals used to generate the synthesis crosstalk suppression signal. Therefore, desired suppression of the crosstalk component can be expected regardless of the situation in the vehicle cabin such as the transmission characteristics specific to the closed space in the vehicle cabin 108z in which the obstacle Ob is present between the microphone placed in front of the occupant A who is the other speaker and the mouth of the occupant A.

The acoustic crosstalk suppression device 105 further includes the voice recognition unit 146 that performs the voice recognition on utterance content of the occupant D based on the voice signal after the crosstalk suppression (an example of the voice signal of the main speaker in which the crosstalk component is suppressed), and the main signal acquisition unit 162 that switches, as the voice signal of the occupant D, the voice signal collected by the other microphone disposed in the vicinity of the occupant D among the four microphones when it is determined that the voice recognition fails. Accordingly, the acoustic crosstalk suppression device 105 can succeed in the voice recognition by setting, as the main signal, the voice signal of the voice of the occupant D collected by the other microphone disposed in the vicinity of the occupant D. Therefore, the success of the voice recognition can be expected regardless of the situation in the vehicle cabin 108z such as the transmission characteristics specific to the closed space in the vehicle cabin 108z in which the obstacle is present between the microphone placed in front of the occupant D and the mouth of the occupant D.

The acoustic crosstalk suppression device 105 further includes the voice recognition unit 146 that performs the voice recognition on the utterance content of the occupant D based on the voice signal after the crosstalk suppression, and the reference signal acquisition unit 166 that replaces the combination of the reference signals used to generate the synthesis crosstalk suppression signal with the combination of other reference signals when it is determined that the voice recognition fails. The filter update units corresponding to other reference signals after the replacement regenerates the crosstalk suppression signals based on the input other reference signals. Accordingly, even when the voice recognition fails, the acoustic crosstalk suppression device 105 can succeed in the voice recognition by changing the combination of the reference signals used to generate the synthesis crosstalk suppression signal. Therefore, the success of the voice recognition can be expected regardless of the situation in the vehicle cabin 108z such as the transmission characteristics specific to the closed space in the vehicle cabin 108z in which the obstacle Ob is present between the microphone placed in front of the occupant D and the mouth of the occupant D.

The reference signal acquisition unit 166 first sets the combination of the reference signals used for generating the synthesis crosstalk suppression signal as the combination of the maximum number of reference signals collected by the maximum three microphones, and then replaces the combination of the reference signals with the combination of other reference signals in the direction in which the number of reference signals is reduced. Accordingly, by starting the suppression of the crosstalk with the combination of the maximum number of reference signals considered to have the highest suppression performance of the crosstalk component, the acoustic crosstalk suppression device 105 can quickly suppress the crosstalk component with a desired suppression amount, and can accelerate the convergence of the filter coefficient of the filter update unit.

Second Embodiment

In the first embodiment, when the suppression performance of the crosstalk component is not high, the acoustic crosstalk suppression device 105 changes the main signal or the combination of the reference signals, and initializes the filter coefficients. In this case, there is a blank period during which the crosstalk component cannot be suppressed until the acoustic crosstalk suppression device 105 learns new filter coefficients. In a second embodiment, an example of an acoustic crosstalk suppression device 105A that prevents the occurrence of the blank period will be described.

Figure 5:
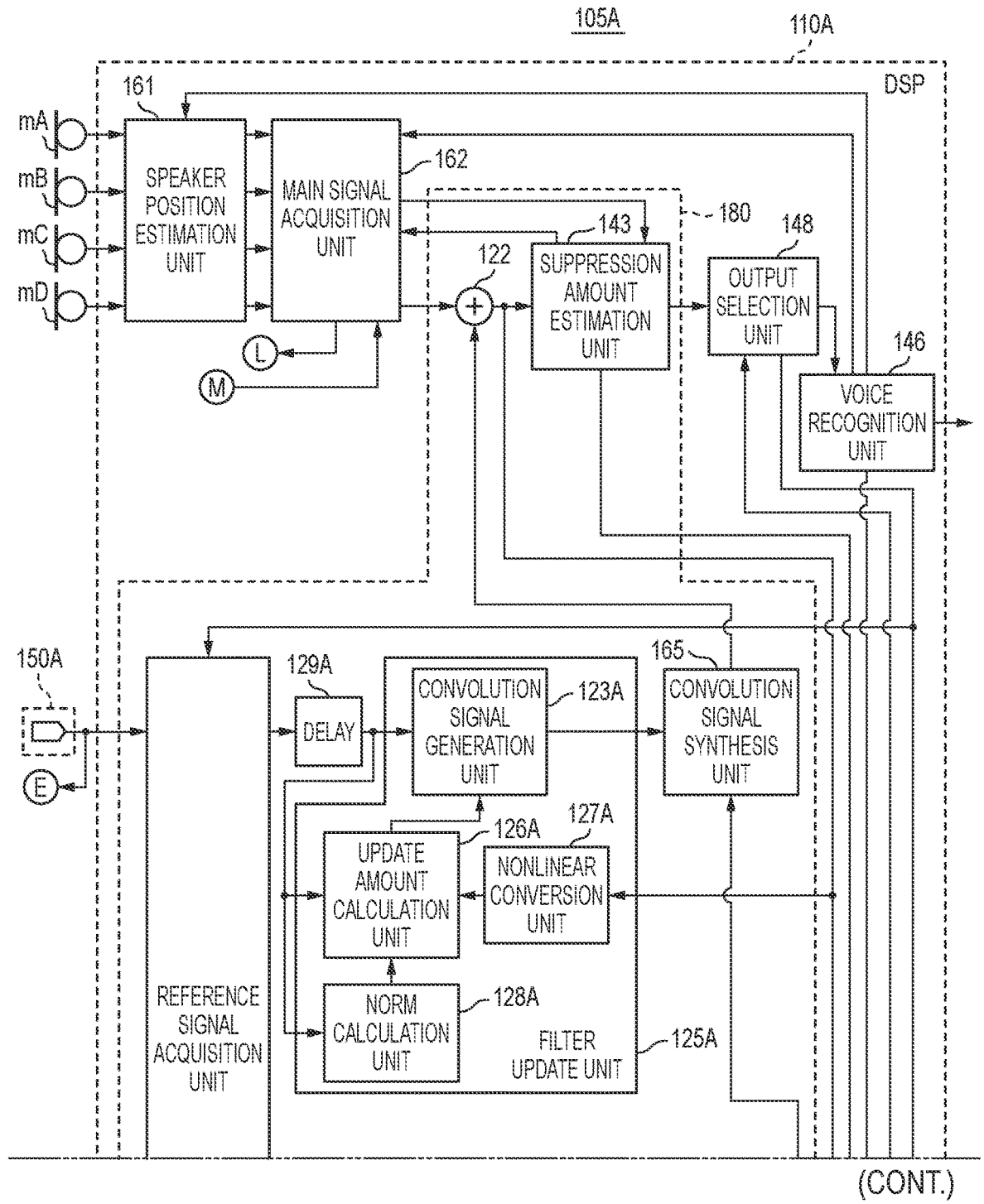
FIG. 5 is a block diagram showing a functional configuration example of an acoustic crosstalk suppression device according to a second embodiment.
Figure 6:
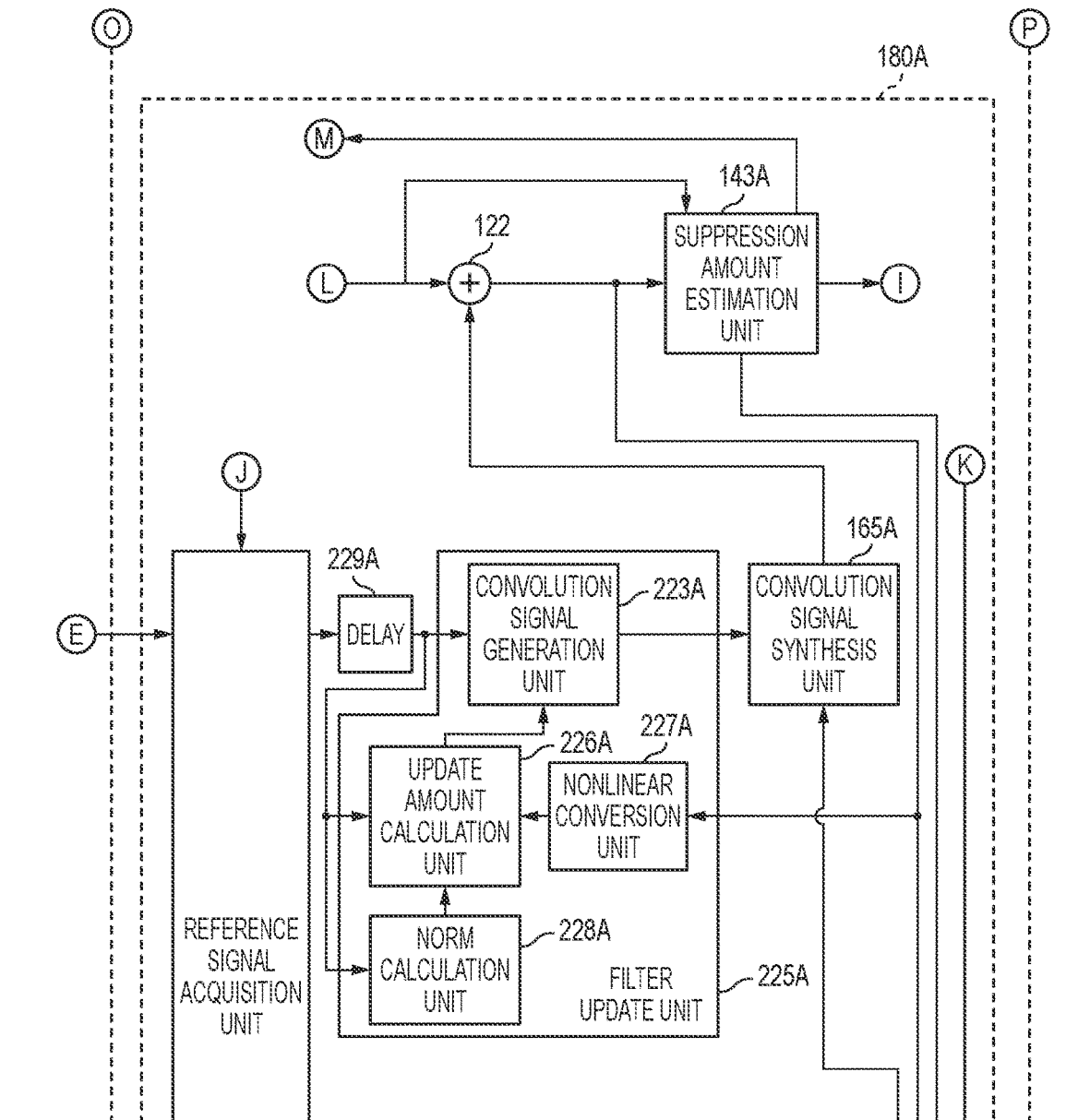
FIG. 6 is a block diagram showing the functional configuration example of the acoustic crosstalk suppression device according to the second embodiment.

FIGS. 5 and 6 are block diagrams showing functional configuration examples of the acoustic crosstalk suppression device 105A according to the second embodiment. Since a configuration of the acoustic crosstalk suppression device 105A is shown in both FIG. 5 and FIG. 6, a connection relationship of each unit is shown by symbols in which alphabets are written in circular symbols.

In the description of the acoustic crosstalk suppression device 105A according to the second embodiment, the same components as those of the acoustic crosstalk suppression device 105 according to the first embodiment are denoted by the same reference numerals, description thereof will be simplified or omitted, and different contents will be described. Here, a configuration of a portion including the reference signal acquisition unit 166, the four delays 129A, 129B, 129C, and 129D, the four filter update units 125A, 125B, 125C, and 125D, the convolution signal synthesis unit 165, the adder 122, and the suppression amount estimation unit 143 according to the first embodiment is referred to as a first signal processing unit 180. That is, the first signal processing unit 180 includes the reference signal acquisition unit 166, the four delays 129A, 129B, 129C, and 129D, the four filter update units 125A, 125B, 125C, and 125D, the convolution signal synthesis unit 165, the adder 122, and the suppression amount estimation unit 143. Since each configuration is the same as that of the first embodiment, description thereof will be simplified.

The acoustic crosstalk suppression device 105A includes the first signal processing unit 180, a second signal processing unit 180A having an internal configuration equivalent to the internal configuration of the first signal processing unit 180, and an output selection unit 148. In the internal configuration of the second signal processing unit 180A, reference numerals of the internal configuration equivalent to that of the first signal processing unit 180 are denoted by "A" at ends of the reference numerals or by corresponding reference numerals in 200s. That is, the second signal processing unit 180A includes a reference signal acquisition unit 166A, four delays 229A, 229B, 229C, and 229D, four filter update units 225A, 225B, 225C, and 225D, a convolution signal synthesis unit 165A, an adder 122A, and a suppression amount estimation unit 143A.

Similar to the first embodiment, the four filter update units 225A, 225B, 225C, and 225D respectively include convolution signal generation units 223A, 223B, 223C, and 223D, filter coefficient monitoring units 241A, 241B, 241C, and 241D, update amount calculation units 226A, 226B, 226C, and 226D, nonlinear conversion units 227A, 227B, 227C, and 227D, and norm calculation units 228A, 228B, 228C, and 228D so as to correspond to each other.

The output selection unit 148 selects any one of a first signal after suppression of a crosstalk component output from the adder 122 of the first signal processing unit 180 and a second signal after suppression of a crosstalk component output from the adder 122A of the second signal processing unit 180A, and outputs the selected signal to the voice recognition unit 146. When selecting the voice signal after the suppression of the crosstalk component, in a case where one of the first signal processing unit 180 and the second signal processing unit 180A is learning a filter coefficient, the output selection unit 148 determines that a crosstalk component included in a main signal is not suppressed in the voice signal after the suppression of the crosstalk component being learned, and selects a voice signal after the suppression of the crosstalk component generated using the other learned filter coefficient.

Next, an operation of the acoustic crosstalk suppression device 105A according to the second embodiment will be shown.

Figure 7:
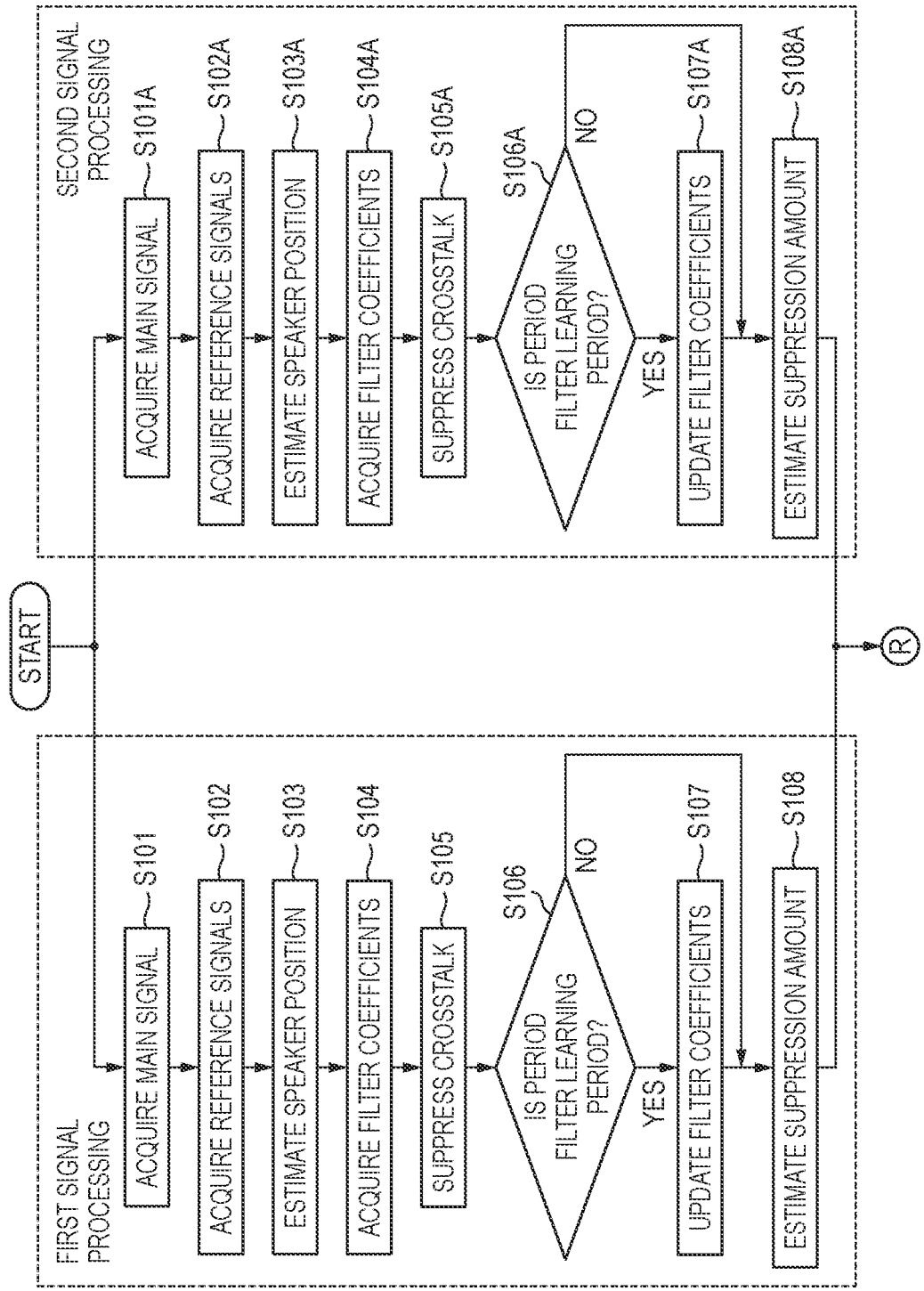
FIG. 7 is a flowchart showing an example of an operation procedure of the acoustic crosstalk suppression device according to the second embodiment.
Figure 8:
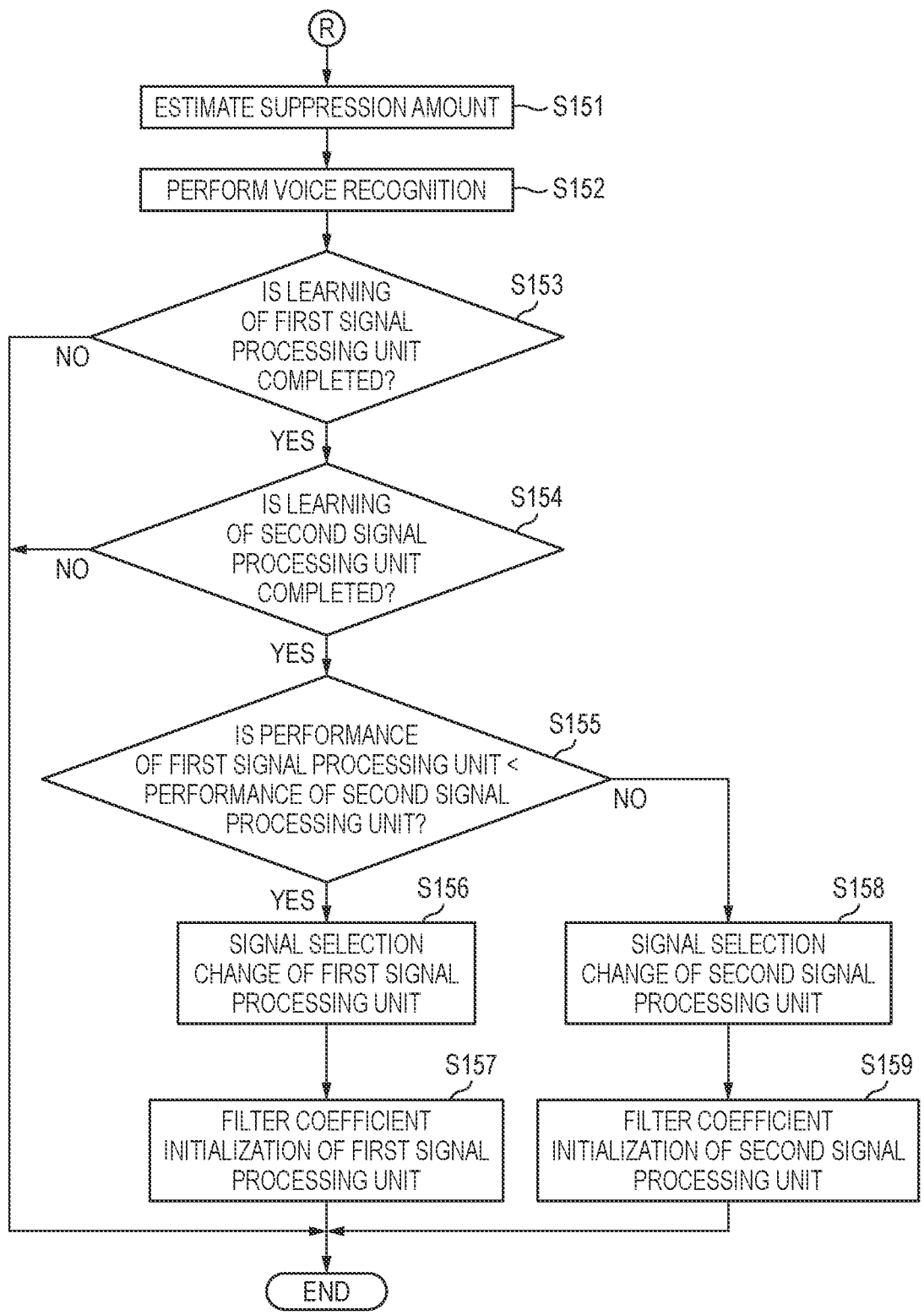
FIG. 8 is a flowchart showing the example of the operation procedure of the acoustic crosstalk suppression device according to the second embodiment.

FIGS. 7 and 8 are flowcharts showing an example of an operation procedure of the acoustic crosstalk suppression device 105A according to the second embodiment. The same processings as those of the acoustic crosstalk suppression device 105 according to the first embodiment are denoted by the same step numbers, description thereof will be simplified or omitted, and different contents will be described. In the second embodiment, in the acoustic crosstalk suppression device 105A, the second signal processing unit 180A performs a signal processing (hereinafter, referred to as "second signal processing") in parallel with a signal processing (hereinafter, referred to as "first signal processing") performed by the first signal processing unit 180. Since the first signal processing is the same as the series of processings of steps S101 to S108 according to the first embodiment, the same step numbers are denoted in FIG. 7 or FIG. 8, and description thereof will be omitted. In contrast, the second signal processing is a processing substantially the same as the first signal processing except that the main signal or a combination of reference signals is different from that of the first signal processing. Therefore, step numbers (here, ends "A" are added) corresponding to the step numbers of the series of processings of steps S101 to S108 in the first signal processing are denoted, and description thereof is simplified or omitted.

In FIG. 7, in the acoustic crosstalk suppression device 105A, the suppression amount estimation unit 143 of the first signal processing unit 180 calculates a first suppression amount of the crosstalk component included in the main signal in step S108, and the suppression amount estimation unit 143A of the second signal processing unit 180A calculates a second suppression amount of the crosstalk component included in the main signal in step S108A corresponding to step S108. Thereafter, the output selection unit 148 selects a voice signal after suppression of the crosstalk component of which crosstalk suppression performance is better (that is, of which the suppression amount of the crosstalk component is larger) between the first suppression amount and the second suppression amount (S151).

The voice recognition unit 146 inputs the voice signal after the suppression of the crosstalk component selected by the output selection unit 148, and performs a voice recognition processing on the voice signal (S152).

Each of the filter update units 125A, 125B, and 125C of the first signal processing unit 180 determines whether learning of the filter coefficient is completed (S153). Here, similar to the first embodiment, when a variation width of the filter coefficient in a predetermined period is within a second threshold, it is determined that the learning of the filter coefficient is completed. When at least one of filter coefficients of the filter update units 125A, 125B, and 125C does not converge, it is determined that the learning of the filter coefficients is not completed. In contrast, when all the filter coefficients of the filter update units 125A, 125B, and 125C converge, it is determined that the learning of the filter coefficients is completed. When it is determined that the learning of the filter coefficients is not completed (S153, NO), a DSP 110A ends the processing of FIG. 8.

When the learning of the filter coefficients is completed (S153, YES), each of the filter update units 225A, 225B, and 225C of the second signal processing unit 180A determines whether the learning of the filter coefficient is completed (S154). Whether the learning of the filter coefficients is completed is determined in the same manner as in the processing of step S153. When it is determined that the learning of the filter coefficients is not completed (S154, NO), the DSP 110A ends the processing of FIG. 8.

When the learning of the filter coefficients is completed (S154, YES), the DSP 110A compares a suppression performance of the crosstalk component by the first signal processing unit 180 (hereinafter, referred to as "suppression performance of the first signal processing unit 180") with a suppression performance of the crosstalk component by the second signal processing unit 180A (hereinafter, referred to as "suppression performance of the second signal processing unit 180A"). That is, the DSP 110A determines whether the suppression performance of the second signal processing unit 180A is better than the suppression performance of the first signal processing unit 180 (S155). The suppression performance of the crosstalk component may be determined by, for example, the suppression amount of the crosstalk component calculated in each of steps S108 and S108A. Further, the suppression performance of the crosstalk component may be determined by a score value that is a voice recognition result when the voice recognition unit 146 performs voice recognition on both voice signals after suppression of the crosstalk component output from the first signal processing unit 180 and the second signal processing unit 180A.

When the suppression performance of the second signal processing unit 180A is better than the suppression performance of the first signal processing unit 180 (S155, YES), the reference signal acquisition unit 166 instructs the first signal processing unit 180 to change the combination of the reference signals (S156). The reference signal acquisition unit 166 changes the combination of the reference signals in accordance with the instruction. Further, the main signal acquisition unit 162 may instruct the first signal processing unit 180 to change the main signal. The main signal acquisition unit 162 changes the main signal in accordance with the instruction. A procedure for changing the main signal or the combination of the reference signals is performed with a procedure the same as that of the first embodiment.

When the main signal or the combination of the reference signals is changed, the filter update units 125A, 125B, and 125C of the first signal processing unit 180 initialize the filter coefficients (S157). When the filter coefficients are initialized, the DSP 110A ends the processing of FIG. 8. Thereafter, the filter update units 125A, 125B, and 125C resume the learning of the filter coefficients in the next sample. In a period during which the first signal processing unit 180 learns the filter coefficients, the second signal processing unit 180A suppresses the crosstalk component.

In contrast, when the suppression performance of the first signal processing unit 180 is better than the suppression performance of the second signal processing unit 180A (S155, NO), the reference signal acquisition unit 166A instructs the second signal processing unit 180A to change the combination of the reference signals (S158). The reference signal acquisition unit 166A changes the combination of the reference signals in accordance with the instruction. Further, the main signal acquisition unit 162 may instruct the second signal processing unit 180A to change the main signal. The main signal acquisition unit 162 changes the main signal in accordance with the instruction. The procedure for changing the main signal or the combination of the reference signals is performed with a procedure the same as that of the first embodiment.

When the main signal or the combination of the reference signals is changed, the filter update units 225A, 225B, and 225C of the second signal processing unit 180A initialize the filter coefficients (S159). When the filter coefficients are initialized, the DSP 110A ends the processing shown in FIG. 8. Thereafter, the filter update units 225A, 225B, and 225C resume the learning of the filter coefficients in the next sample. In a period during which the second signal processing unit 180A learns the filter coefficients, the first signal processing unit 180 suppresses the crosstalk component.

A combination of the main signal and the reference signals may be changed to the same combination in the first signal processing unit 180 and the second signal processing unit 180A. When the combination of the main signal and the reference signals is changed to the same combination, the filter coefficients of the first signal processing unit 180 and the second signal processing unit 180A are different from each other until the learning is completed.

Regarding the acoustic crosstalk suppression device 105A according to the second embodiment, when the filter coefficients are sufficiently learned by both the first signal processing unit 180 and the second signal processing unit 180A, the acoustic crosstalk suppression device 105A compares the suppression performances of the crosstalk components and changes the main signal or the combination of the reference signals for the one having inferior suppression performance. The acoustic crosstalk suppression device 105A suppresses the crosstalk component by using the filter coefficients obtained by one of the first signal processing unit 180 and the second signal processing unit 180A, which is superior in the suppression performance, until new filter coefficients are learned by one of the first signal processing unit 180 and the second signal processing unit 180A, which is inferior in the suppression performance. Therefore, the acoustic crosstalk suppression device 105A can omit the blank period during which the crosstalk component cannot be suppressed. Further, the suppression performance can be enhanced for both the first signal processing unit 180 and the second signal processing unit 180A. Further, since the voice recognition is performed on a voice signal after suppression of the crosstalk component from one of the first signal processing unit 180 and the second signal processing unit 180A, which is superior in the suppression performance, a voice recognition rate is improved.

In this way, the acoustic crosstalk suppression device 105A includes the first signal processing unit 180 including at least the four filter update units 125A, 125B, 125C, and 125D and the adder 122, and the second signal processing unit 180A including at least the four filter update units 225A, 225B, 225C, and 225D and the adder 122A. Further, the acoustic crosstalk suppression device 105A selects and outputs, by the output selection unit 148, any one of a voice signal after the crosstalk suppression generated by the first signal processing unit 180 (that is, a first voice signal of the main speaker after the crosstalk component is suppressed using a first synthesis suppression signal) and a voice signal after the crosstalk suppression generated by the second signal processing unit 180A (that is, a second voice signal of the main speaker after the crosstalk component is suppressed using a second synthesis suppression signal). A combination of the voice signal of the occupant D and the reference signals suppressed by the first signal processing unit 180 is different from a combination of the voice signal of the occupant D and the reference signals suppressed by the second signal processing unit 180A.

Accordingly, in a case where the suppression performance of any one of the first signal processing unit 180 and the second signal processing unit 180A is low, the acoustic crosstalk suppression device 105A can avoid a situation in which the crosstalk component cannot be suppressed until the filter coefficients of the filter update units of one of the first signal processing unit and the second signal processing unit are relearned, by suppressing the crosstalk component by using the other of the first signal processing unit and the second signal processing unit when the filter coefficients are relearned by reselecting a combination of the voice signal of the occupant D and/or the reference signals collected by microphones, of one of the first signal processing unit and the second signal processing unit having low suppression performance. Further, since the first signal processing unit 180 and the second signal processing unit 180A are different from each other in the combination of the voice signal of the occupant D and/or the reference signals collected by the microphones, the suppression performance of the crosstalk component is improved by using the first signal processing unit 180 or the second signal processing unit 180A having superior suppression performance.

The first signal processing unit 180 includes the suppression amount estimation unit 143 that estimates the first suppression amount of the crosstalk component based on the voice signal after the crosstalk suppression (an example of the first synthesis suppression signal). The second signal processing unit 180A includes the suppression amount estimation unit 143A that estimates the second suppression amount of the crosstalk component based on the voice signal after the crosstalk suppression (an example of the second synthesis suppression signal). When the first suppression amount is smaller than the second suppression amount, the first signal processing unit 180 changes any one of the main signal of the occupant D suppressed by the first signal processing unit 180 and the combination of the reference signals. Accordingly, the acoustic crosstalk suppression device 105A can improve the suppression performance of the first signal processing unit 180 by changing any one of the main signal and the combination of the reference signals of the first signal processing unit 180 in which the suppression amount of the crosstalk component is small between the first signal processing unit 180 and the second signal processing unit 180A.

When the second suppression amount is smaller than the first suppression amount, the second signal processing unit 180A changes any one of the main signal of the occupant D suppressed by the second signal processing unit 180A and the combination of the reference signals. Accordingly, the acoustic crosstalk suppression device 105A can improve the suppression performance of the second signal processing unit 180A by changing any one of the main signal and the combination of the reference signals of the second signal processing unit 180A in which the suppression amount of the crosstalk component is small between the first signal processing unit 180 and the second signal processing unit 180A.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in various embodiments described above may be combined optionally in a range without deviating from the spirit of the invention.

For example, a case where the number of microphones arranged in the vehicle cabin is four is shown in the above-described embodiments, but three or five or more microphones may be arranged in the vehicle cabin. When the three or five or more microphones are arranged, the acoustic crosstalk suppression device is provided with the same number of sets of the delays and the filter update units as the number of microphones.

In the above-described embodiments, when generating the synthesis crosstalk suppression signal, the number of sets of the delays and the filter update units, which is smaller by one than the number of microphones, is used. For example, when the number of microphones is four, three sets of the delays and the filter update units are used, but the same number of sets of the delays and the filter update units as the number of microphones may be used.

In the above-described embodiments, the voice signal after the crosstalk component is suppressed is input to the voice recognition unit 146, but the acoustic crosstalk suppression device according to the present disclosure is not limited to the use of the voice recognition, and the configuration of the voice recognition unit 146 may be omitted. The acoustic crosstalk suppression device according to the present disclosure can also be used for, for example, a hands-free call, and can also suppress a crosstalk component (for example, an uttered voice of an occupant (for example, the occupant D) in the vehicle cabin 108z) included in an uttered voice of a call partner.

The present application is based on a Japanese patent application filed on Nov. 21, 2019 (Japanese Patent Application No. 2019-210690), and the contents of which are incorporated herein by reference.

INDUSTRIAL APPLICABILITY

The present disclosure is useful by adaptively suppressing an acoustic crosstalk component that may be included in an uttered voice of a main speaker present in a closed space such as a vehicle cabin to improve sound quality of the uttered voice of the main speaker.

REFERENCE SIGNS LIST 105, 105A acoustic crosstalk suppression device
110, 110A DSP
122, 122A adder
123A, 123B, 123C, 123D, 223A, 223B, 223C, 223D convolution signal generation unit
125A, 125B, 125C, 125D, 225A, 225B, 225C, 225D filter update unit
126A, 126B, 126C, 126D, 226A, 226B, 226C, 226D update amount calculation unit
127A, 127B, 127C, 127D, 227A, 227B, 227C, 227D nonlinear conversion unit
128A, 128B, 128C, 128D, 228A, 228B, 228C, 228D norm calculation unit
129A, 129B, 129C, 129D, 229A, 229B, 229C, 229D delay
143, 143A suppression amount estimation unit
146 voice recognition unit
150A, 150B, 150C, 150D, 152 memory
161 speaker position estimation unit
162 main signal acquisition unit
165, 156A convolution signal synthesis unit
166, 166A reference signal acquisition unit
180 first signal processing unit
180A second signal processing unit
mA, mB, mC, mD microphone

The invention claimed is:

1. An acoustic crosstalk suppression device, comprising:
a speaker estimation unit configured to estimate a main speaker in a closed space based on voice signals collected by n units of microphones arranged in the closed space corresponding to n number of persons, n being an integer equal to or larger than 3;
n units of filter update units each of which comprises a filter configured to generate a suppression signal of a crosstalk component caused by utterance of another speaker and included in a voice signal of the main speaker, and each of which is configured to update a parameter of the filter for suppressing the crosstalk component to store an update result of the parameter of the filter therein;
a crosstalk suppression unit configured to suppress the crosstalk component included in the voice signal of the main speaker by using a synthesis suppression signal based on first suppression signals generated by a maximum of n-1 units of the filter update units corresponding to reference signals collected by a maximum of n-1 units of the microphones other than a microphone corresponding to the main speaker;
a suppression amount estimation unit configured to estimate a suppression amount of the crosstalk component; and
a reference signal acquisition unit configured to replace a first combination of the reference signals used to generate the synthesis suppression signal with a second combination of other reference signals in a case where the suppression amount is equal to or smaller than a first threshold,
wherein the filter update units corresponding to the other reference signals after replacement regenerate second suppression signals based on an input of the other reference signals.

2. The acoustic crosstalk suppression device according to claim 1, further comprising:
a synthesis unit configured to synthesize the first suppression signals generated by the maximum of the n-1 units of the filter update units.

3. The acoustic crosstalk suppression device according to claim 1,
wherein the filter provided in each of the maximum of the n-1 units of the filter update units generates one of the first suppression signals by using a latest stored parameter.

4. The acoustic crosstalk suppression device according to claim 1,
wherein a filter update unit corresponding to a reference signal collected by a microphone corresponding to the another speaker updates the parameter of the filter provided in the filter update unit by using the reference signal, and stores the update result of the parameter of the filter.

5. The acoustic crosstalk suppression device according to claim 1, further comprising:
a main signal acquisition unit configured to replace with, as the voice signal of the main speaker, a second voice signal collected by another microphone disposed in a vicinity of the main speaker among the n units of the microphones in the case where the suppression amount is equal to or smaller than the first threshold.

6. The acoustic crosstalk suppression device according to claim 1, further comprising:
a voice recognition unit configured to perform voice recognition on an utterance content of the main speaker based on the voice signal of the main speaker in which the crosstalk component is suppressed; and
a main signal acquisition unit configured to switch to, as the voice signal of the main speaker, another voice signal collected by another microphone disposed in a vicinity of the main speaker among the n units of the microphones in a case where the voice recognition fails.

7. The acoustic crosstalk suppression device according to claim 1, further comprising:
a voice recognition unit configured to perform voice recognition on an utterance content of the main speaker based on the voice signal of the main speaker in which the crosstalk component is suppressed,
wherein the reference signal acquisition unit is further configured to replace the first combination of the reference signals used to generate the synthesis suppression signal with a third combination of the other reference signals in a case where the voice recognition fails.

8. The acoustic crosstalk suppression device according to claim 1,
wherein the reference signal acquisition unit selects a combination of a maximum number of the reference signals collected by the maximum of the n-1 units of the microphones as the second combination of the other reference signals used to generate the synthesis suppression signal, and then reduces a number of selected combinations of the other reference signals to replace the second combination of the other reference signals with a third combination of the other reference signals.

9. An acoustic crosstalk suppression method executed by an acoustic crosstalk suppression device, the acoustic crosstalk suppression method comprising:
estimating a main speaker in a closed space based on voice signals collected by n units of microphones arranged in the closed space corresponding to n number of persons, n being an integer equal to or larger than 3;
updating, by each of n units of filter update units, a parameter of a filter that generates a suppression signal of a crosstalk component caused by utterance of another speaker and included in a voice signal of the main speaker, and storing, by each of the n units of the filter update units, an update result of the parameter of the filter for suppressing the crosstalk component therein,
suppressing the crosstalk component included in the voice signal of the main speaker by using a synthesis suppression signal based on first suppression signals generated by a maximum of n-1 units of the filter update units corresponding to reference signals collected by a maximum of n-1 units of the microphones other than a microphone corresponding to the main speaker;
estimating a suppression amount of the crosstalk component; and
replacing a first combination of the reference signals used to generate the synthesis suppression signal with a second combination of other reference signals in a case where the suppression amount is equal to or smaller than a first threshold,
wherein the filter update units corresponding to the other reference signals after the replacing regenerate second suppression signals based on an input of the other reference signals.

10. The acoustic crosstalk suppression device according to claim 7,
wherein the reference signal acquisition unit selects a combination of a maximum number of the reference signals collected by the maximum of the n-1 units of the microphones as the third combination of the other reference signals used to generate the synthesis suppression signal, and then reduces a number of selected combinations of the other reference signals to replace the third combination of the other reference signals with a fourth combination of the other reference signals.

11. An acoustic crosstalk suppression device, comprising:
a processor; and
a memory including a program that, when executed by the processor, causes the processor to perform processing, the processing including:
estimating a main speaker in a closed space based on voice signals collected by n units of microphones arranged in the closed space corresponding to n number of persons, n being an integer equal to or larger than 3;
generating, via n units of filters, a suppression signal of a crosstalk component caused by utterance of another speaker and included in a voice signal of the main speaker, and updating, for each filter, a parameter of the filter for suppressing the crosstalk component to store an update result of the parameter of the filter;
suppressing the crosstalk component included in the voice signal of the main speaker by using a synthesis suppression signal based on first suppression signals generated by a maximum of n-1 units of the filters corresponding to reference signals collected by a maximum of n-1 units of the microphones other than a microphone corresponding to the main speaker;
estimating a suppression amount of the crosstalk component; and replacing a first combination of the reference signals used to generate the synthesis suppression signal with a second combination of other reference signals in a case where the suppression amount is equal to or smaller than a first threshold, wherein the filters corresponding to the other reference signals after replacement regenerate second suppression signals based on an input of the other reference signals.

* * * * *